United States Patent
Flack et al.

(10) Patent No.: US 10,063,652 B2
(45) Date of Patent: *Aug. 28, 2018

(54) DISTRIBUTED CACHING SYSTEM WITH DISTRIBUTED NOTIFICATION OF CURRENT CONTENT

(71) Applicant: Akamai Technologies, Inc., Cambridge, MA (US)

(72) Inventors: Martin T. Flack, San Francisco, CA (US); Moritz M. Steiner, Sausalito, CA (US); Stephen L. Ludin, Mill Valley, CA (US); Jozef Hatala, San Mateo, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,940

(22) Filed: Sep. 29, 2017

(65) Prior Publication Data

US 2018/0027089 A1 Jan. 25, 2018

Related U.S. Application Data

(63) Continuation of application No. 15/356,070, filed on Nov. 18, 2016, now Pat. No. 9,807,190, which is a
(Continued)

(51) Int. Cl.
*H04L 29/08* (2006.01)
*H04N 21/231* (2011.01)
*H04L 29/06* (2006.01)

(52) U.S. Cl.
CPC ...... *H04L 67/2842* (2013.01); *H04L 67/1095* (2013.01); *H04L 67/1097* (2013.01);
(Continued)

(58) Field of Classification Search
None
See application file for complete search history.

(56) References Cited

U.S. PATENT DOCUMENTS 5,852,747 A * 12/1998 Bennett ............. G06F 17/30171
710/40
6,012,126 A * 1/2000 Aggarwal ........... G06F 12/0866
709/203

(Continued)

OTHER PUBLICATIONS

MPEP 609 Transmittal Letter filed with this application, dated Sep. 29, 2017.
(Continued)

*Primary Examiner* — Backhean Tiv

(57) ABSTRACT

Described herein are systems, devices, and methods for content delivery on the Internet. In certain non-limiting embodiments, a caching model is provided that can support caching for indefinite time periods, potentially with infinite or relatively long time-to-live values, yet provide prompt updates when the underlying origin content changes. In one approach, an origin server can annotate its responses to content requests with tokens, e.g., placing them in an appended HTTP header or otherwise. The tokens can drive the process of caching, and can be used as handles for later invalidating the responses within caching proxy servers delivering the content. Tokens may be used to represent a variety of kinds of dependencies expressed in the response, including without limitation data, data ranges, or logic that was a basis for the construction of the response.

16 Claims, 12 Drawing Sheets

Related U.S. Application Data continuation of application No. 14/046,884, filed on Oct. 4, 2013, now Pat. No. 9,648,125.

(52) U.S. Cl.
CPC ... *H04N 21/23106* (2013.01); *H04L 63/0884* (2013.01); *H04L 67/02* (2013.01); *H04L 2209/76* (2013.01)

(56) References Cited

U.S. PATENT DOCUMENTS

| | | | | |
|---|---|---|---|---|
| 6,026,413 | A * | 2/2000 | Challenger | G06F 12/0815 707/798 |
| 6,122,666 | A * | 9/2000 | Beurket | G06F 17/30902 707/E17.12 |
| 6,757,708 | B1 * | 6/2004 | Craig | G06F 17/30902 707/999.01 |
| 7,103,714 | B1 * | 9/2006 | Jacobs | G06F 17/30902 707/E17.12 |
| 7,149,807 | B1 * | 12/2006 | Kontothanassis | H04L 67/1008 709/230 |
| 7,200,681 | B1 * | 4/2007 | Lewin | H04L 67/2842 709/246 |
| 7,240,100 | B1 * | 7/2007 | Wein | H04L 67/1008 709/214 |
| 7,552,220 | B2 * | 6/2009 | Marmigere | H04L 29/06 709/201 |
| 7,734,823 | B2 * | 6/2010 | Tsimelzon | G06F 9/44 709/246 |
| 7,752,258 | B2 * | 7/2010 | Lewin | H04L 67/2842 709/203 |
| 8,301,839 | B2 | 10/2012 | Sundarrajan et al. | |
| 8,320,560 | B2 * | 11/2012 | Orsini | H04L 9/085 380/37 |
| 8,402,525 | B1 * | 3/2013 | Shah | H04L 41/0273 726/28 |
| 8,856,263 | B2 * | 10/2014 | Fainberg | G06F 17/30902 709/203 |
| 9,189,510 | B2 * | 11/2015 | Song | G06F 17/30345 |
| 9,418,353 | B2 | 8/2016 | Flack et al. | |
| 9,483,508 | B1 * | 11/2016 | Wilkes | G06F 17/30312 |
| 9,641,640 | B2 | 5/2017 | Flack et al. | |
| 9,648,125 | B2 * | 5/2017 | Flack | H04N 21/23106 |
| 9,807,190 | B2 * | 10/2017 | Flack | H04L 67/2842 |
| 2002/0156911 | A1 * | 10/2002 | Croman | G06F 21/10 709/235 |
| 2003/0004998 | A1 * | 1/2003 | Datta | G06F 17/30902 715/234 |
| 2003/0051100 | A1 * | 3/2003 | Patel | G06F 17/30902 711/118 |
| 2003/0069828 | A1 | 4/2003 | Blazey et al. | |
| 2003/0188106 | A1 * | 10/2003 | Cohen | H04L 67/1095 711/133 |
| 2004/0267824 | A1 * | 12/2004 | Pizzo | G06F 17/30902 |
| 2005/0177377 | A1 * | 8/2005 | Wright | G06F 8/20 717/104 |
| 2006/0080546 | A1 * | 4/2006 | Brannon | G06F 21/6218 713/185 |
| 2006/0133409 | A1 * | 6/2006 | Prakash | H04L 12/2898 370/450 |
| 2006/0184639 | A1 | 8/2006 | Chua et al. | |
| 2006/0191015 | A1 * | 8/2006 | Foster | H04N 7/1675 726/27 |
| 2007/0028068 | A1 * | 2/2007 | Golding | G06F 3/0605 711/170 |
| 2007/0043824 | A1 * | 2/2007 | Fremantle | H04L 67/26 709/214 |
| 2007/0136794 | A1 * | 6/2007 | Chin | H04L 63/0807 726/5 |
| 2007/0156845 | A1 * | 7/2007 | Devanneaux | G06F 17/30902 709/217 |
| 2008/0195761 | A1 | 8/2008 | Jabri et al. | |
| 2009/0228494 | A1 * | 9/2009 | Beichter | G06F 17/30362 |
| 2009/0328174 | A1 * | 12/2009 | Cen | H04L 63/08 726/7 |
| 2012/0011360 | A1 * | 1/2012 | Engels | H04L 9/006 713/166 |
| 2012/0110646 | A1 * | 5/2012 | Ajitomi | G06F 21/335 726/4 |
| 2013/0166729 | A1 * | 6/2013 | Gole | G06F 17/30578 709/224 |
| 2013/0212270 | A1 * | 8/2013 | Hsieh | H04L 67/32 709/225 |
| 2013/0246588 | A1 * | 9/2013 | Borowicz | H04L 41/08 709/220 |
| 2013/0305057 | A1 * | 11/2013 | Greco | G06F 21/80 713/189 |
| 2014/0040863 | A1 * | 2/2014 | Hale | G06F 8/36 717/123 |
| 2014/0040993 | A1 * | 2/2014 | Lorenzo | G06F 21/41 726/4 |
| 2014/0164776 | A1 * | 6/2014 | Hook | H04L 9/14 713/171 |
| 2015/0006146 | A1 * | 1/2015 | Wilkes | G06F 17/2229 704/5 |
| 2015/0012257 | A1 * | 1/2015 | Backholm | H04L 41/145 703/13 |
| 2015/0100660 | A1 * | 4/2015 | Flack | H04N 21/23106 709/213 |
| 2015/0100664 | A1 * | 4/2015 | Flack | H04L 67/28 709/213 |
| 2015/0207897 | A1 * | 7/2015 | Flack | H04L 67/2842 709/213 |
| 2015/0222642 | A1 * | 8/2015 | Bergman | H04L 63/0892 726/7 |
| 2015/0222681 | A1 * | 8/2015 | Basile | H04L 65/60 709/219 |
| 2016/0248587 | A1 * | 8/2016 | Westberg | H04L 63/0281 |
| 2017/0019484 | A1 * | 1/2017 | Koum | H04L 65/1069 |
| 2018/0027089 | A1 * | 1/2018 | Flack | H04N 21/23106 |
| 2018/0041599 | A1 | 2/2018 | Flack et al. | |

OTHER PUBLICATIONS

U.S. Appl. No. 15/356,070.
U.S. Appl. No. 14/046,884.
U.S. Appl. No. 14/507,601.
U.S. Appl. No. 14/507,754.
U.S. Appl. No. 15/467,918.
Barish, Greg et al., "World Wide Web Caching: Trends and Techniques", IEEE Communications Magazine ( vol. 38, Issue: 5, May 2000 ) pp. 178-184, downloaded Feb. 1, 2018 from http://fac-staff.seattleu.edu/zhuy/web/teaching/Spring08/csse492/webcaching/webcache_intro1.pdf.
Kolhi, Pooja et al., "Cache Invalidation and Propagation in Distributed Caching", Technical Report NCSU CSC TR-2005-7, Feb. 2005,, Downloaded Feb. 5, 2018, from http://www4.ncsu.edu/~rychirko/Papers/techReport021505.pdf, citation and date is according to http://www4.ncsu.edu/~rychirko/Papers/techReports.html, 39 pages.
R. Fielding, et al., "Hypertext Transfer Protocol—HTTP/1.1", IETF RFC 2616, Jun. 1999, section 14.19.
R. Fielding, et al., "Hypertext Transfer Protocol (HTTP/1.1): Conditional Requests", draft-ietf-httpbis-p4-conditional-24, IETF Internet Draft, Sep. 25, 2013, 28 pages.
Wikipedia, , "ETag", downloaded May 19, 2018 from en.wikipedia.org/wiki/HTTP_ETag.
Wikipedia, , "HTTP ETag", version as of Sep. 9, 2013, 3 pages, downloaded May 19, 2018 from https://en.wikipedia.org/w/index.php?title=HTTP_ETag&oldid=572216599.
European Patent Office, , "Communication Pursuant to Article 94(3) EPC", Office Action for Application No. 14850783.3, counterpart to U.S. Appl. No. 14/046,884, communication dated May 23, 2018, 5 pages.

* cited by examiner

Origin ← Proxy ← ................................................ ← Proxy ← Client

*FIG. 8a*

Proxy ← Client

Proxy ← ................................................ ← Proxy ← Client

Origin ← Proxy ← ................................................ ← Proxy ← Client

*FIG. 8b*

Holo ← Proxy ← Client

Holo ← ................................................ ← Holo ← Proxy ← Client

Origin ← Proxy ← Holo ← ................................................ ← Holo ← Proxy ← Client

*FIG. 8c*

Holo ← Proxy ← Client

Origin ← Proxy ← ................................................ ← Holo ← Proxy ← Client

*FIG. 8d*

Origin → Proxy → Holo → ................................................ → Holo

*FIG. 8e*

DISTRIBUTED CACHING SYSTEM WITH DISTRIBUTED NOTIFICATION OF CURRENT CONTENT

CROSS REFERENCE TO RELATED APPLICATIONS

This application is a continuation of U.S. application Ser. No. 15/356,070, filed Nov. 18, 2016, which is a continuation of U.S. application Ser. No. 14/046,884, filed Oct. 4, 2013 (now issued as U.S. Pat. No. 9,648,125), the teachings of all of which are hereby incorporated by reference in their entirety.

BACKGROUND OF THE INVENTION

Technical Field

This disclosure generally relates to distributed data processing systems and to the delivery of content to users over computer networks, and more particularly to techniques for caching content to accelerate content delivery over computer networks.

Brief Description of the Related Art

Distributed computer systems are known in the prior art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. This infrastructure is typically shared by multiple tenants, the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence.

In a known system such as that shown in FIG. 1, a distributed computer system 100 is configured as a content delivery network (CDN) and has a set of machines 102 distributed around the Internet. Typically, most of the machines are servers located near the edge of the Internet, i.e., at or adjacent end user access networks. A network operations command center (NOCC) 104 may be used to administer and manage operations of the various machines in the system. Third party sites affiliated with content providers, such as web site 106, offload delivery of content (e.g., HTML or other markup language files, embedded page objects, streaming media, software downloads, and the like) to the distributed computer system 100 and, in particular, to the CDN servers (which are sometimes referred to as "edge" servers). Such servers may be grouped together into a point of presence (POP) 107 at a particular geographic location.

The CDN servers are typically located at nodes that are publicly-routable on the Internet, within or adjacent nodes that are located in mobile networks, in or adjacent enterprise-based private networks, or in a combination thereof.

Typically, content providers offload their content delivery by aliasing (e.g., by a DNS CNAME) given content provider domains or sub-domains to domains that are managed by the service provider's authoritative domain name service. The server provider's domain name service directs end user client machines 122 that desire content to the distributed computer system (or more particularly, to one of the CDN serves in the platform) to obtain the content more reliably and efficiently. The CDN servers respond to the client requests, for example by fetching requested content from a local cache, from another CDN server, from the origin server 106 associated with the content provider, or other source.

For cacheable content, CDN servers typically employ a caching model that relies on setting a time-to-live (TTL) for each cacheable object. After it is fetched, the object may be stored locally at a given CDN server until the TTL expires, at which time the object is typically re-validated or re-fetched from the origin server 106. For non-cacheable objects (sometimes referred to as 'dynamic' content), the CDN server typically must return to the origin server 106 each time when the object is requested by a client. The CDN may operate a server cache hierarchy to provide intermediate caching of customer content in various CDN servers closer to the CDN server handling a client request than the origin server 106; one such cache hierarchy subsystem is described in U.S. Pat. No. 7,376,716, the disclosure of which is incorporated herein by reference.

Although not shown in detail in FIG. 1, the distributed computer system may also include other infrastructure, such as a distributed data collection system 108 that collects usage and other data from the CDN servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115. A distributed data transport mechanism 120 may be used to distribute control information (e.g., metadata to manage content, to facilitate load balancing, and the like) to the CDN servers. The CDN may include a network storage subsystem (sometimes referred to herein as "NetStorage") which may be located in a network datacenter accessible to the CDN servers and which may act as a source of content, such as described in U.S. Pat. No. 7,472,178, the disclosure of which is incorporated herein by reference.

As illustrated in FIG. 2, a given machine 200 in the CDN comprises commodity hardware (e.g., a microprocessor) 202 running an operating system kernel (such as Linux or variant) 204 that supports one or more applications 206. To facilitate content delivery services, for example, given machines typically run a set of applications, such as an (hypertext transfer protocol) HTTP proxy 207, a name server 208, a local monitoring process 210, a distributed data collection process 212, and the like. The HTTP proxy 207 (sometimes referred to herein as a global host or "ghost") typically includes a manager process for managing a cache and delivery of content from the machine. For streaming media, the machine may include one or more media servers, such as a Windows Media Server (WMS) or Flash server, as required by the supported media formats.

A given CDN server shown in FIG. 2 may be configured to provide one or more extended content delivery features, preferably on a domain-specific, content-provider-specific basis, preferably using configuration files that are distributed to the CDN servers using a configuration system. A given configuration file preferably is XML-based (extensible markup language-based) and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN machines. More information about a CDN platform can be found in U.S. Pat. Nos. 6,108,703 and 7,596,619, the teachings of which are hereby incorporated by reference in their entirety.

In a typical operation, a content provider identifies a content provider domain or sub-domain that it desires to have served by the CDN. The CDN service provider associates (e.g., via a canonical name or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server machine associated with the IP address. The request includes a host header that includes the original content provider domain or sub-domain. Upon receipt of the request with the host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as noted above.

The CDN platform may be considered as an overlay across the Internet on which communication efficiency can be improved. Improved communications on the overlay can help when a CDN server needs to obtain requested content from an origin server 106 or from another CDN server that is acting as an intermediate cache-parent, or when accelerating communication of non-cacheable content across the overlay on behalf of a content provider, or otherwise. Communications between CDN servers and/or across the overlay may be enhanced or improved using route selection, protocol optimizations including TCP enhancements, persistent connection pooling and reuse, content & header compression and de-duplication, and other techniques such as those described in U.S. Pat. Nos. 6,820,133, 7,274,658, 7,607,062, and 7,660,296, among others, the disclosures of which are incorporated herein by reference.

As an overlay offering communication enhancements and acceleration, the CDN server resources may be used to facilitate wide area network (WAN) acceleration services between enterprise data centers and/or between branch-headquarter offices (which may be privately managed), as well as to/from third party software-as-a-service (SaaS) providers used by the enterprise users.

Along these lines, CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider).

To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end. FIG. 3 illustrates a general architecture for a WAN optimized, "behind-the-firewall" service offering such as that described above, along with examples of possible data flows across the overlay. Other information about a behind the firewall service offering can be found in teachings of U.S. Pat. No. 7,600,025, the teachings of which are hereby incorporated by reference.

While known techniques, such as those currently used in CDNs, offer many advantages, there is a need for techniques to better accelerate traffic for which a no-store or explicit-TTL caching approach is suboptimal, which is an increasing and important part of the traffic on the Internet. Content accessed through application programmer interfaces (API) are one example of such traffic. With the foregoing by way of introduction, the improved systems, methods, and apparatus that are the subject of this disclosure are described below.

BRIEF SUMMARY

This disclosure describes, among other things, systems, devices, and methods for content delivery on the Internet. A caching model is described that can improve upon known time-to-live (TTL) based caching and no-store approaches (although such techniques can be used in conjunction with the teachings hereof, as will be explained below). Approaches described herein can support caching for indefinite time periods, while still updating promptly when the underlying origin content changes, making them suited for, among other things, content retrieved using an application-programming-interface (API), although this is not a limitation.

For example, in one embodiment, an origin server can be programmed to annotate its responses to client content requests with identifiers in the form of tokens. (In the case of an API, the API running on the origin server can be programmed to annotate responses to client requests made to the API with tokens.) The tokens can drive the process of caching the origin responses within caching proxy servers in the delivery platform. The TTL for issued responses can be considered to be infinite, or relatively long, enabling acceleration from cached responses in the proxies. Subsequently, the tokens can be used as handles to invalidate prior responses.

Typically, tokens can correspond to or denote data or logic used to create the response at origin. For example, a particular record in a database driving content generation at origin can correspond to a token. A token could also correspond to a file or other data at origin. When such a record, file, or other origin data is updated, then an invalidation assertion can be issued for the token (from origin, for example) and propagated to the appropriate proxy caches. Responses in the proxy caches that were tagged with the token then can be invalidated, as those responses are dependent on data that has changed. A token could correspond to any item or set of data, so the approach is flexible with regards to the origin database structure and content generation infrastructure.

Tokens can be used in a variety of other ways. For example, tokens can be used to indicate that a data selection or sorting algorithm has been used to create the response. Later, the 'selection/sorting' token can be used as a handle to invalidate the response when the selection or sorting of data in the response is outdated. In this way, a token can denote logic that was applied at origin and expressed in the response.

As a further example, tokens may also be considered to be "range" tokens by expressing ranges of values in a specific syntactic style. A response can be tagged with a range tokens that indicate, for example, a range of values that the response relates to. A subsequent invalidation of a specific value within the range of previously listed range tokens can invalidate those range tokens and the responses to which they were connected.

The subject matter described herein has a wide variety of applications in content delivery and online platform architectures, and can be used in conjunction with CDN services and technologies.

As those skilled in the art will recognize, the foregoing description merely refers to examples of the invention in order to provide an introduction. Other embodiments will be described in the remainder of this document. The foregoing is not limiting and the teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

BRIEF DESCRIPTION OF THE DRAWINGS

The invention will be more fully understood from the following detailed description taken in conjunction with the accompanying drawings, in which:

FIG. 6 is a schematic diagram of an example network of Hologram nodes and messaging flow amongst the nodes, in accordance with the teachings hereof;

FIGS. 8a-e are schematic diagrams illustrating an example of message flows in a hierarchical arrangement of caching servers;

DETAILED DESCRIPTION

Figure 1:
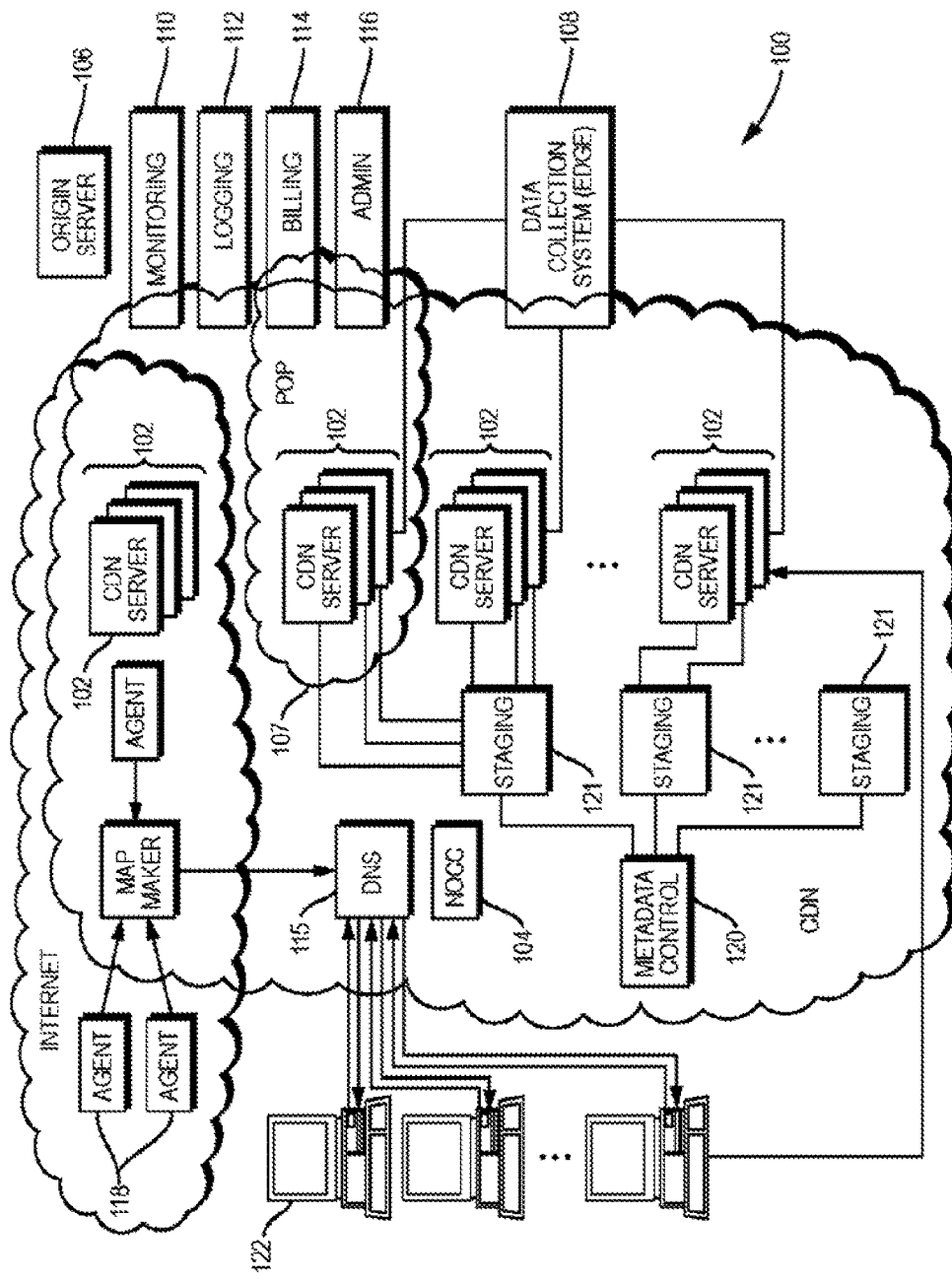
FIG. 1 is a schematic diagram illustrating one embodiment of a known distributed computer system configured as a content delivery network.

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety. The abbreviation "e.g." is used herein as shorthand for the non-limiting phrase "for example."

According to this disclosure the functionality of a server is modified to provide content acceleration using a caching system that supports indefinite caching periods, or said another way, notification-based invalidation instead of, or in supplement to, time-expiration based invalidation. The server is typically a caching proxy server modified in accordance with the teachings hereof, and may be part of a distributed CDN platform.

The techniques described herein may, in certain embodiments, offer improved acceleration for a variety of kinds of traffic, and are particularly useful for (without limitation) API traffic. This disclosure describes approaches to caching of API traffic, of the kind where the content provider customer offers an API to its users and the request/responses delivered via that API are carried over and accelerated via a CDN, so as to enable productized API acceleration. While the API use case is often used herein to provide a concrete example and illustration, the teachings hereof are not limited to API traffic. Any traffic that can benefit from an indefinite caching period with notification-based invalidation can benefit from the teachings hereof. The benefits may vary, but the teachings hereof can be used with respect to delivery of any kind of object.

In one embodiment, a system employs a set of caching proxy servers such as the CDN proxy servers described above and these caching proxy servers are modified in accordance with the teachings hereof. Such modified servers are sometimes referred to herein as "Hologram" servers, a mnemonic inspired from "project a hologram of your database into the network", to differentiate the system from placing the authoritative copy of a database into the CDN system itself, which these teachings do not require (but with which would also be compatible).

Note that in some implementations, the Hologram servers may be used in supplement to other CDN proxy servers (e.g., that do not provide the caching and acceleration functions described herein) by acting, for example, as a cache parent to the front line of CDN proxy servers deployed at the network edge.

In operation, the customer's origin infrastructure can issue one or more tokens (sometimes referred to as tags) with API responses, preferably in certain non-standard HTTP headers. This is an adjustment to origin programming. The tokens drive the process of caching and invalidating these API responses within the CDN platform and in particular at the Hologram servers. Tokens issued by origin notate the pieces of data used in the API responses. The TTL for the API responses can be considered to be infinite (or very long, e.g., a year) for these responses, allowing them to be cached. The origin later invalidates by token, potentially invalidating multitudes of prior API responses.

The tokens can be used as cache handling directives, allowing responsive content to exist in cache and remain valid for serving for a long time when underlying origin data is quiet, and then rapidly update in response to a flurry of changes at origin. This approach can support caching that is neither no-store nor TTL based, which are today's predominant approaches for accelerating un-cacheable dynamic objects, and offers an eventually-consistent (but preferably rapidly consistent) data model. The approach is database-agnostic, allowing a content provider customer to utilize any SQL or NoSQL database they like at origin.

The tokens can denote a variety of things. In a common case, a token is associated with an item of data that appears in or was used to construct the given API response. Such a token can act as a handle for invalidating (from a caching perspective) an API response when data associated with that given data token changes in an origin database underlying the API is no longer valid. Thus, a token can correspond to or has some ready counterpart in the underlying database. For example, the token can represent a primary key for a record in the origin database, and when that record changes, the token can be used to invalidate those API responses that were based on that record.

Tokens may represent abstractions in lieu of actual fields or rows of data in a database. Thus tokens may denote logic that was used to create a given response at origin. For example, tokens can be used to indicate that the API response is the product of data sorting, data selection algorithm, or other algorithm. Such tokens can be used as handles to invalidate a cached response when, for example, the sort or selection of data (rather than the data itself) is outdated. Consider the case of a response that represents the most recent ten items in a table. This response could leverage such a token. Issuing tokens for the ten current constituent items would not properly cause an invalidation when a newer item arrives; the newer item arriving can trigger an invalidation of the sorting token for this table rather than one of the ten original item tokens.

Tokens may also be considered "range" tokens by expressing ranges of values in a specific syntactic style that is recognized. A response can be tagged with a range tokens that indicate, for example, a range of values that the response relates to, such as a latitude/longitude ranges for map data returned in a response. A subsequent invalidation of a specific value within the range of previously listed range tokens can invalidate those range tokens and the responses to which they were connected. Thus, an update to a given point within the range (such as the addition of a new point of interest at particular coordinates within the map) can trigger cache invalidation of the previous response.

The meanings of tokens are preferably selected such that collectively the tokens notating a particular response are tied to the data and logic that gave rise to the construction of the response but that might at some later time be altered, and to match conveniently the ability to later invalidate upon those tokens, taking into consideration how the origin system will maintain and monitor its own state, how to conveniently refer to pieces of data by a handle, and how to reliably express all changes to data through one or more tokens.

Figure 4A:
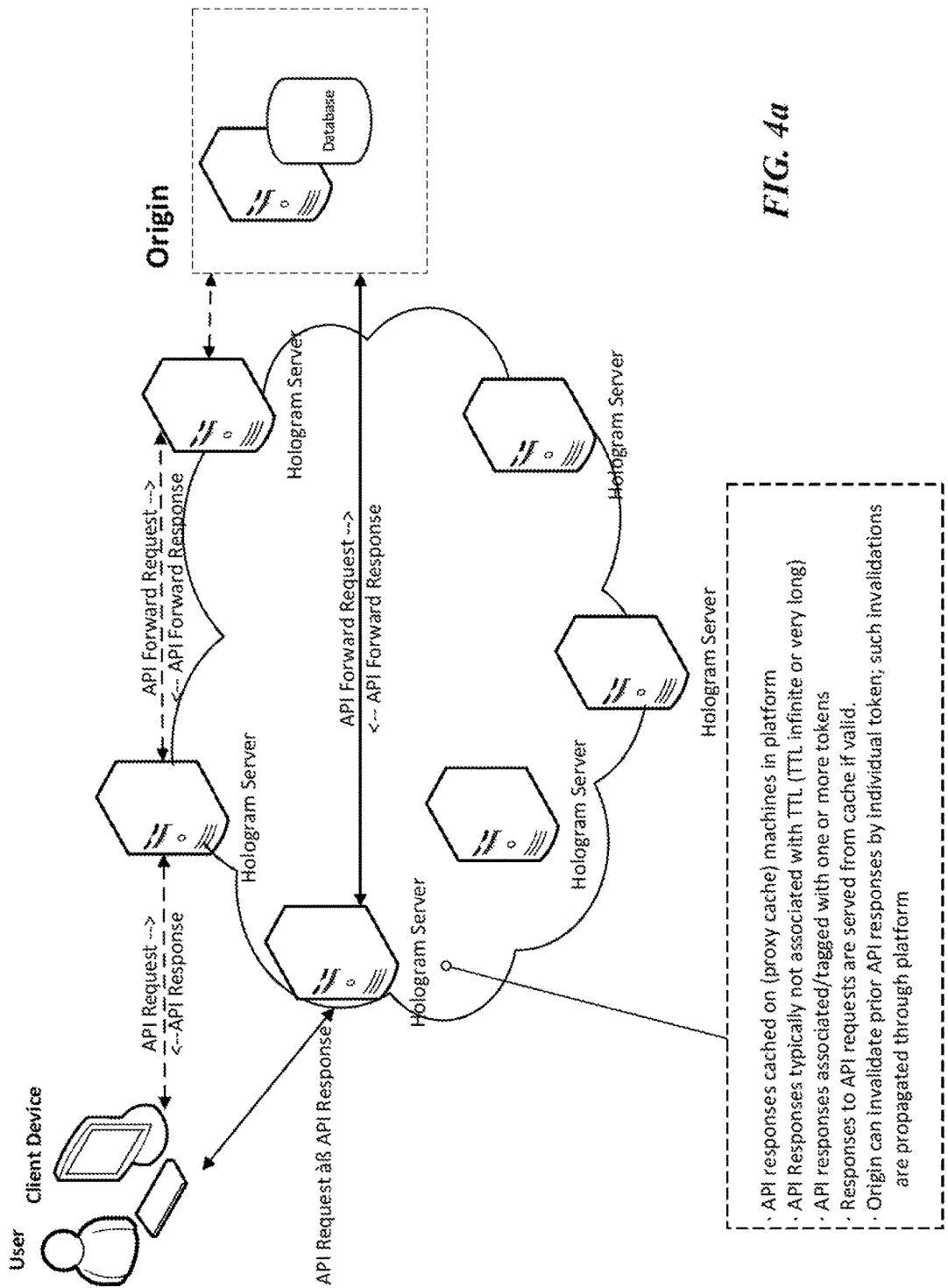
FIG. 4a is a schematic diagram illustrating one embodiment of message flow in an example system that accelerates delivery of content using caching techniques that leverage the teachings hereof.

FIG. 4a provides a general overview of one embodiment and shows Hologram servers accelerating API traffic for an origin by proxying and caching API content. Two alternatives are shown in FIG. 4a. The solid lines indicate a flow in which a Hologram server fields a client request and goes forward directly to origin. The dashed lines indicate an alternate flow in which a Hologram server receives a client request and goes forward to another Hologram server, closer to the origin, which then goes forward to origin. The resulting response (with appended tokens) is passed back down from the origin to the parent Hologram to the child Hologram server. The Hologram caches the response, with the tokens, and for subsequent client requests, the Hologram server can serve the response from local cache if the tokens are still valid. Typically, a cached response can be considered invalid to serve to a subsequent client if any of its associated tokens have been invalidated.

Figure 4B:
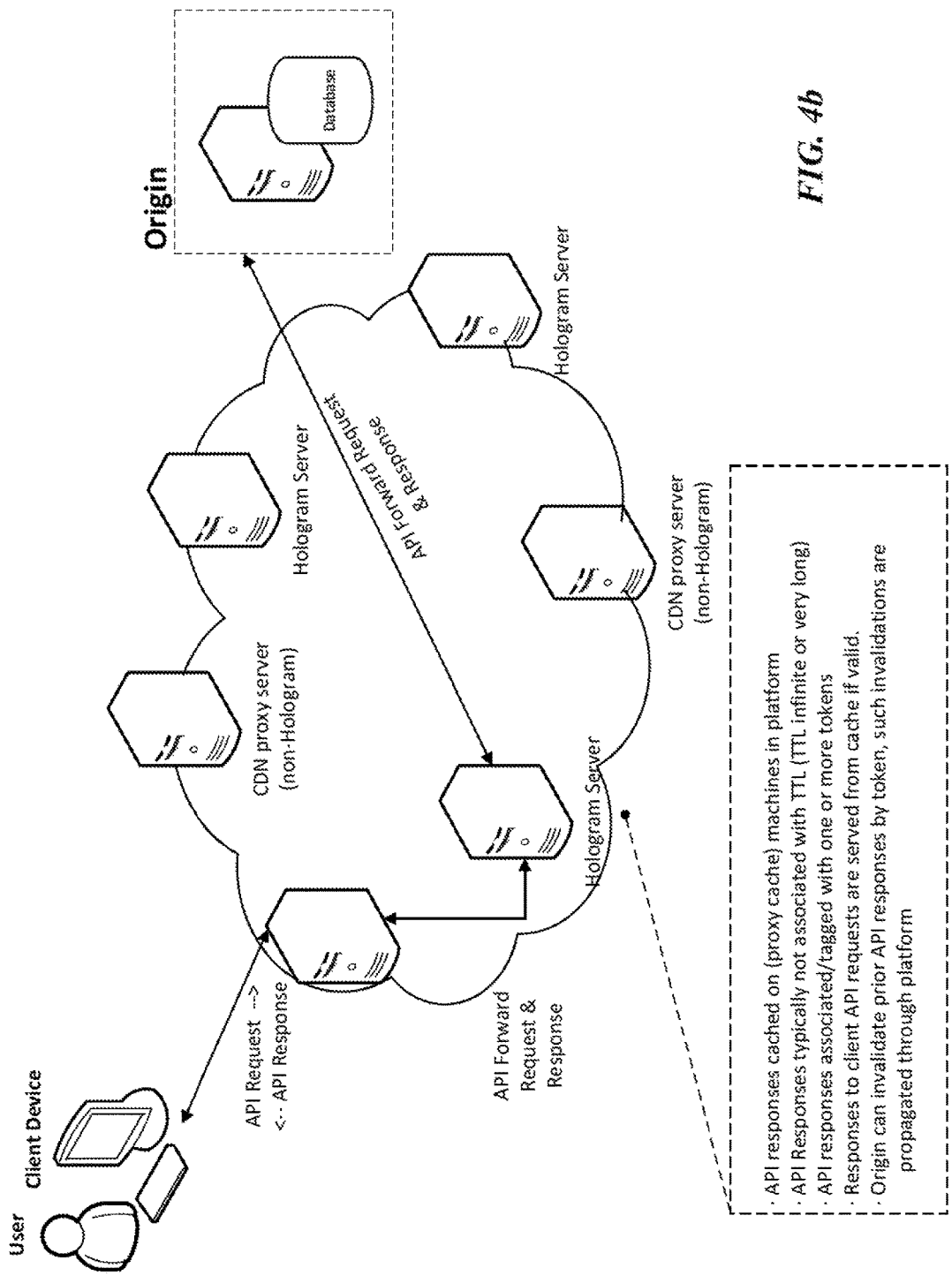
FIG. 4b is a schematic diagram illustrating another embodiment of message flow in an example system that accelerates delivery of content using caching techniques that leverage the teachings hereof.

FIG. 4b illustrates another embodiment in which Hologram servers are deployed in support of other CDN proxy servers (that do not have Hologram functionality) and provide a cache hierarchy function to those other CDN proxy servers. In FIG. 4b, the non-Hologram CDN proxy servers field client requests and make forward requests to Hologram servers to ask for the response, rather than going back to origin directly. Hologram servers can respond from their cache (if a cached response is valid), forward a request to another Hologram server, forward a request to a CDN proxy (in order to ultimately forward to origin), or forward a request directly to origin.

Figure 5:
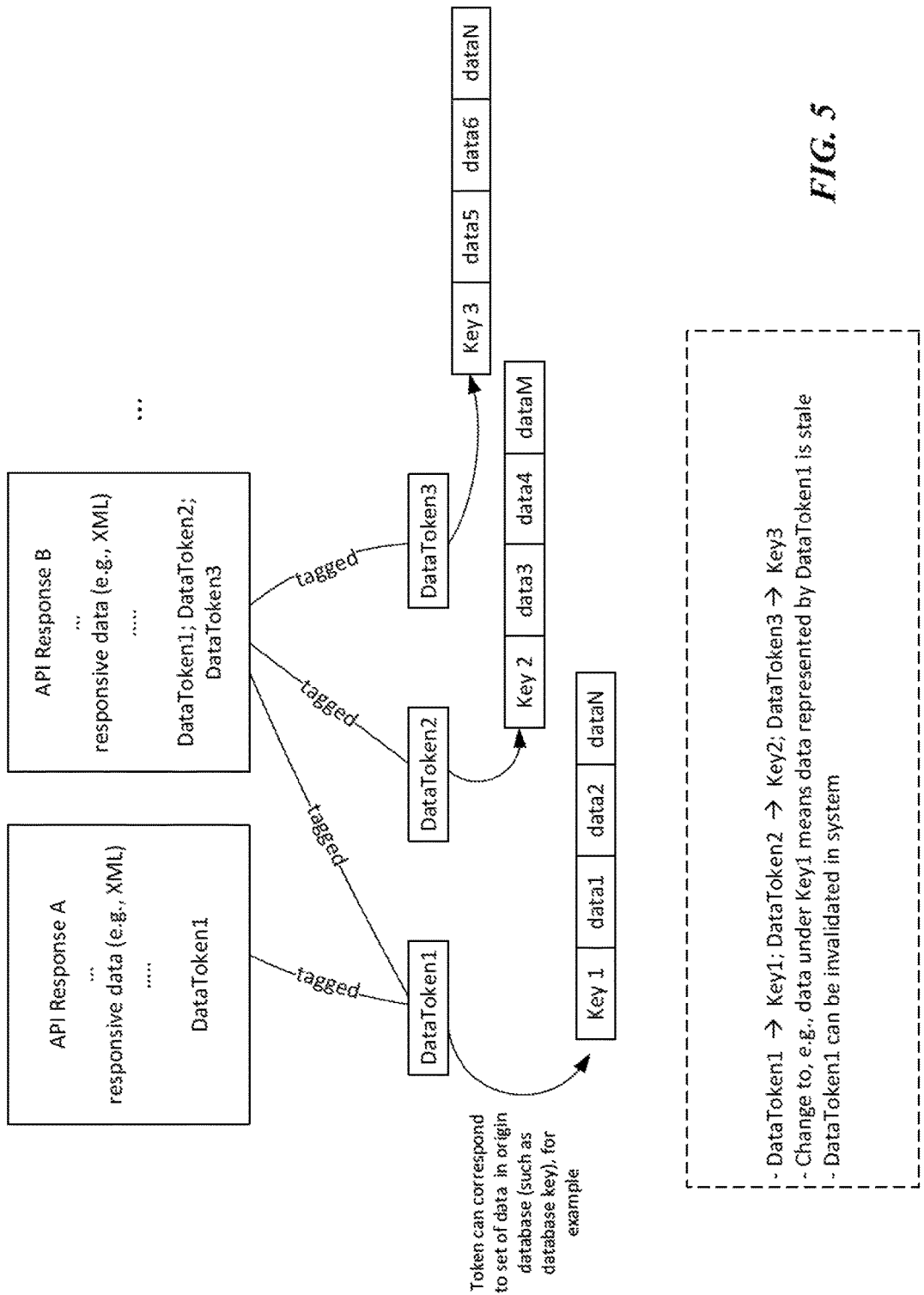
FIG. 5 is a block diagram illustrating examples of relationships between API responses and an example underlying API database, for the case of accelerating API content.

FIG. 5 shows an example of relationships between API responses, tokens that represent records in an origin database, merely by way of illustration. In FIG. 5 the example is shown on DataToken1 being invalidated because the record associate with Key1 was updated. In this case, invalidating DataToken1 in the system would mean that both API Response A and API Response B would be invalidated in the caches, as they both depend on DataToken1.

In a preferred implementation the system is built into a CDN and separate from the origin infrastructure, which hosts the databases and acts as the authoritative source of data from the API. However, the teachings hereof apply to implementations outside of CDN services as well.

Application Programmer Interfaces (APIs)

An API, or Application Programmer Interface, is typically a wrapper around a service, database, or system, made by one team of programmers for another team, often outside their own organization. Some APIs are made for public consumption, and some API's are made for internal use by a company's various teams, as an organizing function. APIs generally encourage encapsulation of unnecessary details and enforce business logic and best practices. APIs often serve as a "focusing agent" to make contributing to a system or ecosystem much, much simpler than without an API, as only the API needs to be understood, nothing else.

In a general technical sense, an API is often realized as a documented set of calls that come with a definition on how they will behave, and usually, the data they will return. In the context of the web, an API often comprises a pattern of HTTP requests understood at a certain domain or URL path that will act inside the web server system and with connected systems, and return information back out to the web client, or take an action and report a result back to the web client.

The web client will not often simply display or render the information directly as returned, as in the case of web browsing, but rather, will use some logic to programmatically act on the data. Often that logic is encoded in Javascript or natively into the client application, e.g., in a mobile app such as one written for the iOS or Android operating systems. In this way, transactions can be accomplished; although, it should be said that simply laying out information on a "page" in an app is also a common use case, although technically it may not be an HTML page as one might understand it in the context of discussing web browser software.

Data is often passed into the web API using GET and POST or other HTTP calls, and returned from the web API using XML or JavaScript object notation (JSON), other open formats, or proprietary formats. The format is generally designed to be easy for a computer to parse.

Example API Call

Much API work is a wrapper of REST calls yielding XML or JSON from SQL database queries. Sometimes the queries are quite complex, or a series of queries is executed for a single response. Sometimes application-layer caching is involved for performance.

For example, consider an airline flight status lookup to a domain api.flight-example.com as follows:

```
GET /xml/flight?id=12345 HTTP/1.1
...
```

Assume that this API request yields the following XML payload in the response:

```
<flightInfo>
    <flightId>12345</flightId>
    <carrier>
        <iata>AA</iata>
        <name>Airy Airlines</name>
        <country>US</country>
    </carrier>
    <number>AA100</number>
    <airports>
        <departure>
            <iata>JFK</iata>
            <name>John F. Kennedy International Airport</name>
            <street1>JFK Airport</street1>
            <street2/>
            <cityName>New York</cityName>
            <city>NYC</city>
            <state>NY</state>
            <postcode>11430</postcode>
            <country>US</country>
            <countryName>United States</countryName>
            <regionName>North America</regionName>
            <timezoneName>America/New_York</timezoneName>
            <weatherzone>NYZ076</weatherzone>
            <latitude>40.642335</latitude>
            <longitude>-73.78817</longitude>
            <elevationFeet>13</elevationFeet>
        </departure>
        <arrival>
            <iata>LHR</iata>
            <name>Heathrow Airport</name>
            <cityName>London</cityName>
            <city>LON</city>
            <state>EN</state>
            <country>GB</country>
            <countryName>United Kingdom</countryName>
            <regionName>Europe</regionName>
            <timezoneName>Europe/London</timezoneName>
            <latitude>51.469603</latitude>
            <longitude>-0.453566</longitude>
            <elevationFeet>80</elevationFeet>
        </arrival>
    </airports>
    <status>late</status>
    <times>
        <departure>
            <scheduled>
                <local>2013-01-01T18:10:00.000</local>
                <utc>2013-01-01T22:10:00.000Z</utc>
            </scheduled>
            <actual>
                <local>2013-01-01T18:05:00.000</local>
                <utc>2013-01-01T22:05:00.000Z</utc>
            </actual>
        </departure>
        <arrival>
            <scheduled>
                <local>2013-01-02T06:20:00.000</local>
                <utc>2013-01-02T05:20:00.000Z</utc>
            </scheduled>
            <actual>
                <local>2013-01-02T06:09:00.000</local>
                <utc>2013-01-02T05:09:00.000Z</utc>
            </actual>
        </arrival>
        <takeoff>
            <scheduled>
                <local>2013-01-01T18:49:00.000</local>
                <utc>2013-01-01T22:49:00.000Z</utc>
            </scheduled>
            <actual>
                <local>2012-08-07T18:23:00.000</local>
                <utc>2012-08-07T22:23:00.000Z</utc>
            </actual>
        </takeoff>
    </times>
    <codeshares>
        <codeshare>
            <carrier>
                <iata>GF</iata>
                <name>Great Air</name>
            </carrier>
            <flightNumber>6654</flightNumber>
        </codeshare>
    </codeshares>
    <airportinfo>
        <departureTerminal>8</departureTerminal>
        <departureGate>B3</departureGate>
        <arrivalTerminal>3</arrivalTerminal>
        <arrivalGate>36</arrivalGate>
    </airportinfo>
    <equipment>
        <iata>777</iata>
        <name>Boeing 777 Passenger</name>
        <enginetype>jet</enginetype>
```

```
            <equipmentNumber>N783AN</equipmentNumber>
        </equipment>
    </flightInfo>
```

This response carries information about a flight, including the airports and flight equipment, but also timestamps regarding planned and actual events. The information in this request will likely not change at all while waiting for the flight, and then a flurry of changes will occur over a few hours that are very real-time sensitive to any consumer of the API, and then after conclusion of the flight, the data will again settle to a permanent quiet period. In the event that some major piece of data changes leading up to the flight, it's likely to be the type of aircraft or departure time or terminal, and in both cases these are changes that should be reflected as instantly as possible in responses.

Serving this type of API response over a dynamic no-store CDN delivery solution with all traffic terminating at origin may make it more reliable than self-hosting. Adding a small period of time-based (TTL) caching in the CDN may make the origin traffic more tolerable, although global latency to consumers is only helped as the TTL rises, which at some level counteracts data freshness. Setting a high TTL and appealing to the purge functionality of a large CDN will result in purge timeframes that are too long for satisfactory updates for this and similar use cases. A new way to look at caching and purging capability may be useful here, and is addressed by the teachings hereof.

Appending Hologram Data Tokens to Example API Response

The Hologram system can accelerate API output similar to that of the API example response above.

In one embodiment, the origin API response can be augmented to comply with Hologram. An HTTP header named "X-Hologram-Data" can be added, which can be listed before the payload as a normal header, or after the payload as a trailer. The use of a trailer may be advantageous because the metadata in the trailer will come as a byproduct of payload construction at origin. In the example below, the value of this header carries tokens separated by commas and optional whitespace following each comma, and the tokens denote data (rather than logic used to construct the response, or ranges).

```
    ...
    Trailer: X-Hologram-Data
    ...
    X-Hologram-Data: flightId:12345,airport:JFK,airport:LHR,
    carrier:AA,flightnumber:AA100,carrier:GF,flightnum:GF6654,
    equipmentnumber:N783AN,equipment:777
```

The size of the added header or trailer, perhaps a couple hundred bytes, would typically add very little to the overall size of the API response, and it would enable Hologram caching. In this example, the metadata is a list of comma-separated tokens. As mentioned previously, a variety of types of tokens are possible (data tokens, selection/sorting tokens, etc.) and a variety of formats are possible too. In this case, the data query was a direct lookup of a flight ID, so only tokens denoting origin data are necessary, and all tokens are essentially table/primary-key combinations.

(For the purpose of this example, assume we know the table names and structure at origin. This is not necessarily reflected in the XML of the API response. In practice, the tokens can be issued by code written by the same developers as the API and thus they understand the underlying data schema.)

The token can be constructed to relate to any set of data in the underlying database at origin. In this example, assume the database supporting the API has a flight table containing the flight ID as a primary key. Therefore it is convenient to have the token be based on and represent the table/primary-key into the database, and so the form "table:key" is a reasonable default template.

The system is flexible though, and the system is generally agnostic to how the token relates to the origin database. The actual table name need not be used; as long as the name is a way to reference a bundle of data that will change or remain constant together. Full normalization is not required; every table relationship need not be represented, as long as when the data changes, one of the tokens represented on this line is considered affected by origin. In sum, the token need not be the actual primary key, though it preferably represents a unique indexed key or hash that the origin can reference rapidly and relate to the actual primary key in the database. In fact the table-colon-value structure is also not needed, and any token matching the regular expression "[A-Za-z0-9/:;_-]+" can be accepted. Syntax extensions may also permit additional feature expression.

This flexibility means that any kind of data can be tokenized for the system. The above example focuses on a SQL database context, but no-SQL, memcache, or even file system elements can be converted into tokens. (For example, an origin could decide to have a token that represents the name of a stored file.)

Returning to the example, the API response references two airports, the departure and arrival airports. Note that for the purpose of tokens, the relationship of the airports is now irrelevant, so which one is the departure versus arrival is not notated, nor is any reference back to the XML necessary at all, as the system need not attempt to parse the XML, and in fact this data payload could have been encoded as JSON or another format.

In an alternate embodiment, the system could determine the tokens from the API response payload itself, rather than relying on origin to produce and append the data tokens in a header. This might occur with or without assisting domain-specific configuration in the CDN for that content provider's API traffic. The domain-specific configuration in the CDN would contain transformation instructions to convert the various payloads into control headers or equivalent expressions with appropriate tokens. For example, a configuration may call for the origin response payload to be scanned by a Hologram server for certain predetermined patterns or markup that designates token information embedded in the response. The token information would typically then be stripped out of the response and converted into a header or other equivalent field for communication within the Hologram system.

As another example, an XSLT file could be associated with each URL pattern in an XML-emitting API, and when a response traverses through a Hologram server (e.g., a Hologram server closest to the origin), the XSLT would be applied to the XML in a standards-compliant manner, in order to generate a resulting document that is the same as, or an XML fragment easily parseable into, the needed header(s) that could have been transmitted along with the response in the first place. Similarly, for JSON responses, a document expressing data structure paths to walk in order to lift values from the JSON could be saved instead of XLST.

After transformation, the transformed document provides the control data (the tokens) that would normally accompany a payload, but the transformation is not intended to necessarily replace the payload. Because the control data ordinarily should not need to change between servers, if a server would normally retain a control header from origin then after performing a transformation, the server may append the control headers derived from transformation to the other HTTP headers before returning the response to a downstream requesting Hologram server. Thus, in the context of FIG. 4a (dashed lines), the parent Hologram server could append the control data before transmitting the decorated response to the child Hologram server.

Continuing through the XML in the API response, we see that timestamps are available for events such as a flight departure time. These are all considered atomic data represented in the token list under the token "flightId:12345." Thus when timestamps change or new timestamps are added, the origin programming would be configured to know that all responses that had the token "flightId:12345" are affected, and (presumably) need to be invalidated.

Carrier codes are represented in the token list by mentioning a token each for the related carrier and for the related carrier's flight number. Because this type of flight number is a consumer flight number, the developer at origin can design to have it stored in a separate table and to use a "flightnum:" table designator as a token.

Finally, the "equipmentNumber:N783AN" and "equipment:777" tokens represents the aircraft itself and a record for the type of airplane (equipment).

Caching Based on Appended Tokens & Invalidation of Tokens

Described above was the issuance of tokens from origin with API response payloads, and how the tokens can represent the data structures in origin databases that gave rise to the content in the payload.

For API responses, the cache time can be infinite or very long-lasting, unlike TTL-based caching where some time is expressed. A Hologram-compatible response is valid so long as none of the constituent tokens are invalidated. In other words, in one implementation, the HTTP proxy caches in a CDN may cache the API responses indefinitely, until affirmatively invalidated by origin.

In the flight record example above, until an invalidation is received for one of the 13 tokens listed, the response XML document is considered to be valid to serve in response to end user client requests. During this time, which may be quite long, the document may be cached by the Hologram servers in the network and served repeatedly from cache.

In an alternative embodiment, the Hologram system could require periodic revalidation of tokens with origin as a safety precaution, and it could also overlay a global TTL to expire API responses notwithstanding that their corresponding data tokens are still valid, as a safety precaution or as a data storage conservation measure. These are both compatible with the teachings hereof.

In an embodiment, a Hologram server can obey standard cache-related HTTP headers emitted from origin, given that such headers would be expressed in conjunction with Hologram control headers and thus could take into account that a much longer time period is appropriate. Obeying all normal HTTP headers is compatible with the teachings hereof.

There are many possible techniques for invalidating a token. Just by way of example, a token might be invalidated by (i) the inclusion of an invalidation assertion for a token in a given API response, or (ii) the active calling of a Token Invalidation API by the origin (when origin changes data outside the context of serving a web request). Such a 'Token Invalidation API' is not to be confused with the API being accelerated.

Turning to invalidation mechanism (i) the Hologram network of servers preferably can handle an invalidation inline with any API response. In most cases, the API response will actually be a response to a client request to update the API database (i.e., a 'write' message), insofar as that event will cause records in the database to change and precipitate an invalidation. However, the architecture can also support an invalidation inline with a response to a client request that is not writing to the database.

To illustrate: let us say for purposes of illustration that the flight status API from above also allows updates to data, and an authenticated user has issued an HTTP call to that API that will update the flight number of the Great Air codeshare for the flight. In the API response from origin, for example an HTTP 200 'ok' response, a Hologram invalidation can be included:

X-Hologram-Data: !flightnumber:AA100,!flightId:12345

This notation would invalidate any document relying on the original flight number and the flight in question by the flight ID. The invalidation is asserted by listing tokens prepended with an exclamation mark to indicate invalidation. The Hologram node can be responsible for initiating the propagation of the invalidation through the remainder of the Hologram network, or preferably for sending the invalidation to a publisher-node in the network that publishes an invalidation channel for the given API domain, more detail on which will be given below.

Turning to invalidation mechanism (ii), the Token Invalidation API mechanism can operate as follows: at some point, assume a piece of information changes. Let us assume that the XML was retrieved before the aircraft landed, and then the aircraft landed, resulting in "arrivalDate", "status", and "actualArrival" nodes to be updated in the XML. The origin may utilize a private and secured Token Invalidation API call to the CDN network to invalidate tokens. HTTPS and some form of API key authorization could be overlaid to the example here. The "/hologram" path would be a pseudo-path understood by Hologram-enabled domains served by the CDN network.

```
POST /hologram/invalidate HTTP/1.1
...
tokens=flightID:12345
```

In many cases, the invalidation of a single token can function to invalidate all responses that were marked with that token, which could potentially represent multitudes of API response documents network-wide. The invalidation message must be propagated across the machines that support Hologram. This single invalidation can be sufficient to invalidate the XML response above, such that a subsequent client request for the same content will need to be forwarded to origin to resolve. This invalidation also simultaneously invalidates any other response that depends on information about flight 12345, that is, any documents previously served with a token of "flightId:12345" among its various appended tokens.

As an alternative invalidation example, let us pretend that London Heathrow Airport was changing its name to The Royal Airport. The invalidation API call would be:

```
POST /hologram/invalidate HTTP/1.1
...
tokens=airport:LHR
```

Once propagated, any response containing information about Heathrow on this particular API is now invalid in the CDN network, and future responses from origin would reflect a different airport name, allowing newly-correct data to populate the CDN network in cache as client requests are fulfilled.

Preferably, the origin can hold open a persistent HTTP or SPDY connection to the Token Invalidation API entrypoint, so that the anticipated series of invalidations can be multiplexed across this connection.

In an alternate embodiment, a Web Socket service could be made available such that origin would open a Web Socket to a CDN server (e.g., one of the Hologram servers or otherwise), and use the Web Socket to transmit invalidations or messages carrying tokens with updated serial numbers implicitly advising of invalidations by virtue of increment, as will be described below.

In yet another example, a hook polling call can be requested by origin, meaning that either origin would make an API call to request, or the domain-specific CDN configuration would dictate, a regular polled HTTP request from a CDN server to the origin, requesting any and all updated token information, which would then be presented by origin in the response, as an alternative to providing it in normal data-carrying responses.

Serial Number Tokens

In an alternate embodiment, a token can have a serial number syntax. For example, each token can be identified by name or moniker (e.g., flightID:12345) with a serial number (flightID:12345.1). More robustly, the serial number format could be expressed as an @ sign followed by a server number, a colon, a serial number, a colon, and a timestamp expressed as an epoch timestamp number in seconds. For example, with an assigned server number of 2000, a serial number incremented to 101, and a timestamp of 1380679283 (corresponding to Oct. 1, 2013 7:01:23 PDT):

flightID:12345@2000:101:1380679010

The identification of the token with the moniker but no serial number syntax is referred to below as 'short-form', while the use of a serial number syntax is referred to as 'long-form'. Such forms of tokens are merely examples to illustrate a concrete implementation and not meant to be limiting.

The serial number can be thought of as a version or iteration number of the token, and each time the corresponding data at origin is updated, the count is incremented. This approach relieves the origin of having to send an express invalidation command; instead, it can merely report the iteration that is now current, and this can function as an implicit invalidation command, as a Hologram node knows to treat all prior token iterations as invalid. Hence, with each API response the origin could append the latest iteration of the relevant data tokens. This invalidation mechanism would also be compatible with the Token Invalidation API described earlier.

As one skilled the art will recognize, the system could use variety of algorithms and token syntaxes to enable a given Hologram server to compare a token cached with a response against a subsequently-received token and make a decision as to whether the cached token is valid. The approach could depend on timestamp ordering, vector clock approaches, or Lamport time stamps, for example.

Exemplary Hologram Network

The following describes a non-limiting embodiment of a network of Hologram servers. An introductory overview to the communications of the Hologram network is presented first.

In this embodiment, the various servers in a Hologram network function as an HTTP proxy network that is capable of answering HTTP client requests, forwarding requests to nodes closer to origin, forwarding to origin, and caching the responses returned as they are served back.

In addition, the Hologram servers can communicate to each other over a messaging system that is separate from the HTTP channel used to communicate with clients and to request and retrieve responses for clients. (The Hologram messaging system could leverage HTTP too, if desired, but for purposes of description herein assume the HTTP traffic refers to the clients' content requests and responses thereto, as well as the forward requests and forward responses resulting from proxy operations.)

Messages are exchanged by the Hologram servers with one of them acting as a registrar, tracking and assigning which of the servers on the network holds publisher status for any given domain name at any given time. Messages are also published on a publisher-subscriber model from each respective publisher to all servers that have subscribed by virtue of receiving HTTP client requests for a domain for which the publishing server is the publisher, as tracked by the registrar. The subscription will communicate token invalidations to subscribed servers, and thus in this approach being subscribed is the status required in order to treat a local cache as authoritative for a given domain. Messages are also passed from non-publishers to the publisher of a given domain if the non-publisher goes forward to origin with an HTTP request (and receives an origin response with a token invalidation) or receives a request from origin on the Token Invalidation API, either of which can cause it to have token messages that should be published.

All of the various connections can have logical timeout conditions based on traffic on the connection itself; further, subscriptions may be unsubscribed per domain as HTTP traffic for that domain becomes absent, and publisher status may be cleared as HTTP traffic for a given domain becomes absent at the publisher. All message connections are described as direct but may also be made to be indirect, through one or more broker nodes or parents, for scalability. The registrar can be an otherwise normal Hologram server acting as registrar in addition to regular actions, but it may be a dedicated registrar-only server or set of servers, or an abstract service provided by other means, such as a distributed database service or DNS service.

Figure 6:
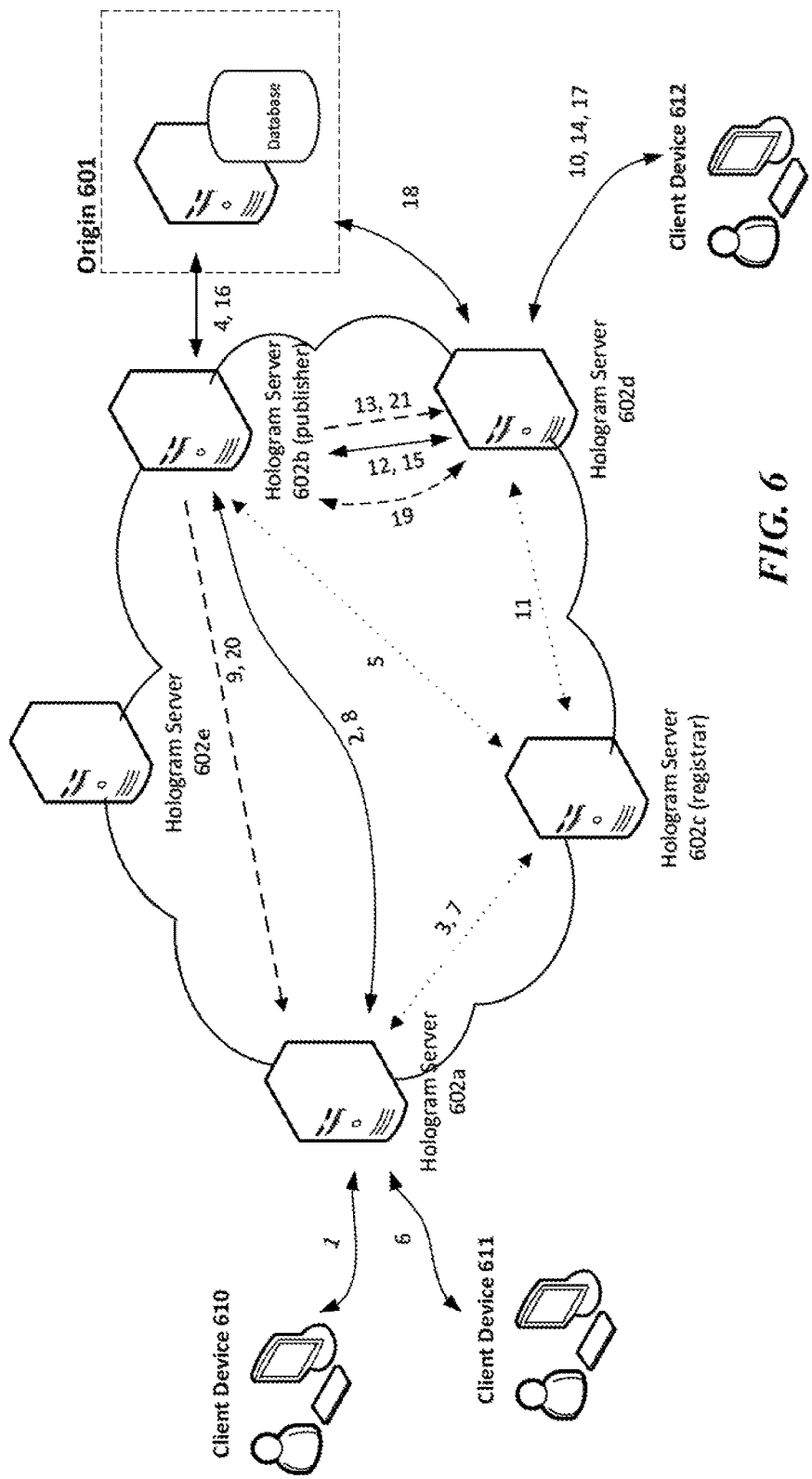
FIG. 6 is a schematic diagram illustrating one embodiment of message flow in an example system that accelerates delivery of content using caching techniques that leverage the teachings hereof.

FIG. 6 is a diagram illustrating various roles and functionality of an example Hologram server platform. In the embodiment shown in FIG. 6, the additional layer of non-Hologram CDN proxy servers (FIG. 4b) between the clients and Hologram servers is not used. That embodiment will be described later.

With reference to FIG. 6, a variety of Hologram servers 602 are distributed in the platform. Labeled line segments represent connections between machines; solid lines designating HTTP request and response messages, and dashed and dotted lines designating connections between Hologram servers for passing token-related and other messages. The dotted lines designate messages for a registrar and the dashed lines designate messages amongst Hologram servers in a publisher-subscriber or peer relationship. In some cases multiple numerical labels are used as shorthand to indicate multiple line segments between the same nodes without drawing the line segments in duplicate.

Assume that user with client device 610 makes an API request using HTTP to Hologram server 602a, as indicated by arrow 1.

Server 602a determines the host domain for the instant HTTP request and determines if the Hologram subscribed status is set locally for the domain. Assume that the status is unsubscribed. As a consequence of being unsubscribed (and also not being the publisher), server 602a is precluded from consulting its local cache for a previous response. Server 602a determines the closest Hologram server to origin 601 as server 602b, and thus prepares to forward the HTTP request to server 602b (configuration may have instead led to server 602a forwarding to one or more cache parent servers before ultimately forwarding to server 602b). Server 602a forwards the HTTP request to server 602b as indicated by arrow 2.

Server 602a sends a message to server 602c which serves currently as the registrar on the network, indicating the domain, its own identity, and a flag indicating that the HTTP request is being forwarded to another Hologram server. This message is indicated by arrow 3. Server 602c acting as the registrar determines that no publisher is set for the given domain and the requesting server is forwarding internally, and returns an unknown response, indicated by the return on arrow 3.

Server 602b receives the HTTP request forwarded by server 602a and performs the same domain check. Assume that server 602b is also unsubscribed. Server 602b forwards the HTTP request to origin 601, indicated by arrow 4.

Server 602b also messages server 602c, the registrar, indicated by arrow 5, and because server 602b is the closest Hologram server to origin (or based on some other metric or combination thereof), server 602c assigns server 602b to perform the publisher role for the domain in question, returning its own identity in the reply message indicated by the return on arrow 5. Server 602b sets itself as the publisher for the given domain upon receiving the reply.

Assume that the reply from registrar server 602c indicated by the return on arrow 5 arrives at server 602b prior to the completion of the HTTP response received from origin 601 indicated by the return on arrow 4. When the HTTP response from origin 601 is received, the tokens attached to the response are parsed, and the response is cached locally at server 602b, with the tokens indexed. In this implementation, each token is upgraded from short form to long form if not received in long form from origin, with server 602b assigning serial numbers to each token and its own server number. The long form tokens are the form cached locally, and returned over HTTP by replacing the original header carrying tokens.

Server 602b replies to the HTTP request from server 602a, as indicated by the return on arrow 2. Server 602a, having an unsubscribed status, does not cache the response locally but strips token-related headers and returns the response to client device 610 as indicated by the return on arrow 1. (If server 602a had a subscribed status, it could cache the response locally for use in responding to subsequent client requests for the same content, as will be stated in more detail below.)

Next, assume that user with client device 611 makes an API request to Hologram server 602a, as indicated by arrow 6, and the request is for the same content as that previously requested by client device 610. Assume that on this domain, cache keys are not derived from user identity.

Server 602a performs the same checks as before, and sends a message to the registrar at server 602c as for the first HTTP client request. This message is indicated by arrow 7. Server 602c responds with the identity of server 602b as the publisher, as indicated by the return on arrow 7. Server 602a opens a subscription connection to server 602b, reusing a connection if one is open, as indicated by line segment 9. Server 602a performs the same calculation to determine the server closest to origin as before, and forwards the HTTP request to server 602b, as indicated by arrow 8.

Server 602b consults its local cache, being the publisher, and finds responsive content for the HTTP request. Further, server 602b verifies that each token attached to the original request has not been invalidated explicitly or implicitly (e.g., by serial number increment) since the response was cached, and returns the cached content to server 602a, as indicated by the return on arrow 8.

Assume that the subscription indicated on line segment 9 is engaged prior to the completion of the HTTP response received from server 602b indicated by the return on arrow 8. When the HTTP response from server 602b is received by server 602a, the tokens attached to the response are parsed, and the response is cached locally at server 602a, with the tokens indexed. Because the tokens are long form with server 602b identified as the server provenance, no upgrade is necessary, and they will later be comparable with incremented serial numbers issued by server 602b.

Further requests to server 602a for the same content as above would result in the content being returned from the local cache at server 602a, provided that the customary HTTP cache control was satisfied or absent (Cache-Control headers and similar) as well as that none of the tokens originally given with the response have since become invalid by a message from the publisher (server 602b) over the subscription channel for that domain.

By way of further illustration, assume that client device 612 makes a request for the same content as above, to server 602d, as indicated by arrow 10. Server 602d would, similarly to the process described above, request publisher identity from server 602c, as indicated by arrow 11, forward the HTTP request to server 602b, as indicated by arrow 12, and subscribe to server 602b for domain messages, as indicated by line segment 13.

Assume that client device 612 later makes a "write" request on the API, sending an HTTP POST to server 602d, as indicated by arrow 14. Assume this domain is configured not to cache POST responses, as is fairly customary with HTTP. Server 602d forwards the request to server 602b as indicated by arrow 15, which forwards the request to origin 601, as indicated by arrow 16.

Origin returns an HTTP response as indicated by the return on arrow 16, and when received at server 602b, the Hologram tokens are parsed similarly to the description above; this time, however, the origin's HTTP response message contains an invalidation for a token using the prepended exclamation point syntax. Assume that the token invalidated was one of the tokens previously mentioned on content returned to client devices 610, 611, and 612 as described above. Server 602b upgrades the token to long form (if not already in that form from origin) with a higher serial number on the token being invalidated than previously assigned. Server 602b creates a token message that is published to servers 602a and 602d by virtue of their subscription to token messages for the domain. Servers 602a and 602d receive the token message and update their local token caches to indicate the higher serial number, implicitly invalidating the HTTP responses previously cached with the older version of the token (as will be discovered by servers 602a and 602d, e.g., when they attempt to use the previously cached response and compare the token serial numbers and/or timestamps).

The HTTP response for the API "write" action is returned to server 602d, as indicated by the return on arrow 15, and then sent to client device 612, as indicated by the return on arrow 14.

Further requests to servers 602a, 602b, or 602d for the content previously cached using the now-invalidated token will result in full traversal back to origin 601 as previously described, with the subsequent repopulation of cached content similarly to previously described.

Assume that client device 612 makes a request for content as above, to server 602d, as indicated by arrow 17. Assume that server 602d calculates that it should forward directly to origin, possibly a supplementary system has indicated that load is high on server 602b, or just the result of an alternative implementation. Server 602d forwards the HTTP request to origin 601, as indicated by arrow 18. Upon receiving the response, Hologram tokens are parsed, and are in need of publishing but server 602d is not the publisher. Server 602d opens a connection for peer-to-peer token passing, or utilizes an existing connection, to server 602b, the publisher for the domain, and passes the token messages to server 602b, as indicated by arrow 19. After updating its token cache, server 602b passes the message to all subscribers, which in this moment are servers 602a and 602d. Server 602a receives the token message, as indicated by arrow 20, and updates its local token cache. Server 602d receives the token message, as indicated by arrow 21, but will not need to alter its token cache as it was the source for the message and has already done so.

Figure 7:
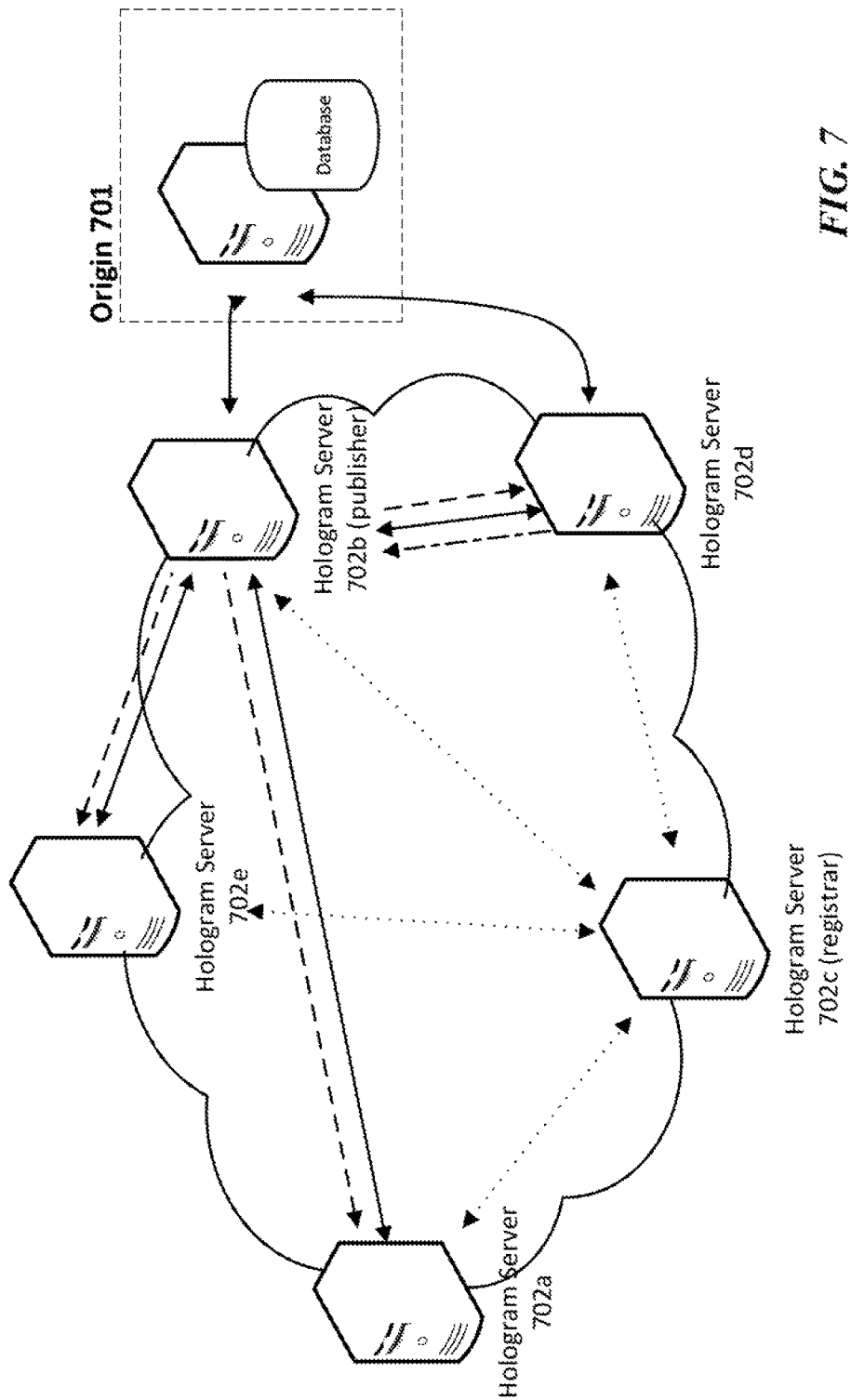
FIG. 7 is a schematic diagram illustrating an example network state of the network shown in FIG. 6.

With reference to FIG. 7, a snapshot state of an example Hologram network is shown. This is a non-limiting embodiment. In this state, all Hologram servers 702a, 702b, 702d, and 702e have connections open to server 702c acting as the registrar. HTTP traffic for one domain has been received from client devices and has resulted in open HTTP connections from servers 702a, 702d, and 702e to server 702b, and a connection from server 702b to origin 701; an HTTP connection is also open from server 702d to origin 701. To facilitate message publishing, servers 702a, 702d, and 702e, the same servers that have open HTTP connections, also have open subscription connections to server 702b, which has been assigned the publisher role for the domain in question. Additionally, server 702d has an open peer connection to server 702b in order to pass token messages arising from contacting origin for HTTP responses. Messages regarding token invalidations generally can be distributed outwards from a point close to origin to all subscribed nodes, even if they are not originated on the server designated as publisher and must first be sent over to the publisher. Token messages can invalidate prior responses that a subscribed node may have saved in cache, and being subscribed is the state that permits the cache to be authoritative in the face of infinite or very long TTL's.

Figure 2:
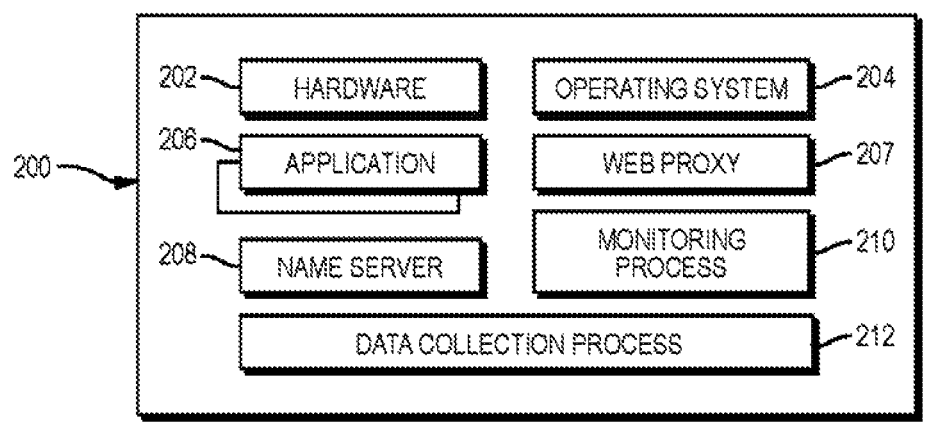
FIG. 2 is a schematic diagram illustrating one embodiment of a machine on which a content delivery server in the system of FIG. 1 can be implemented.
Figure 3:
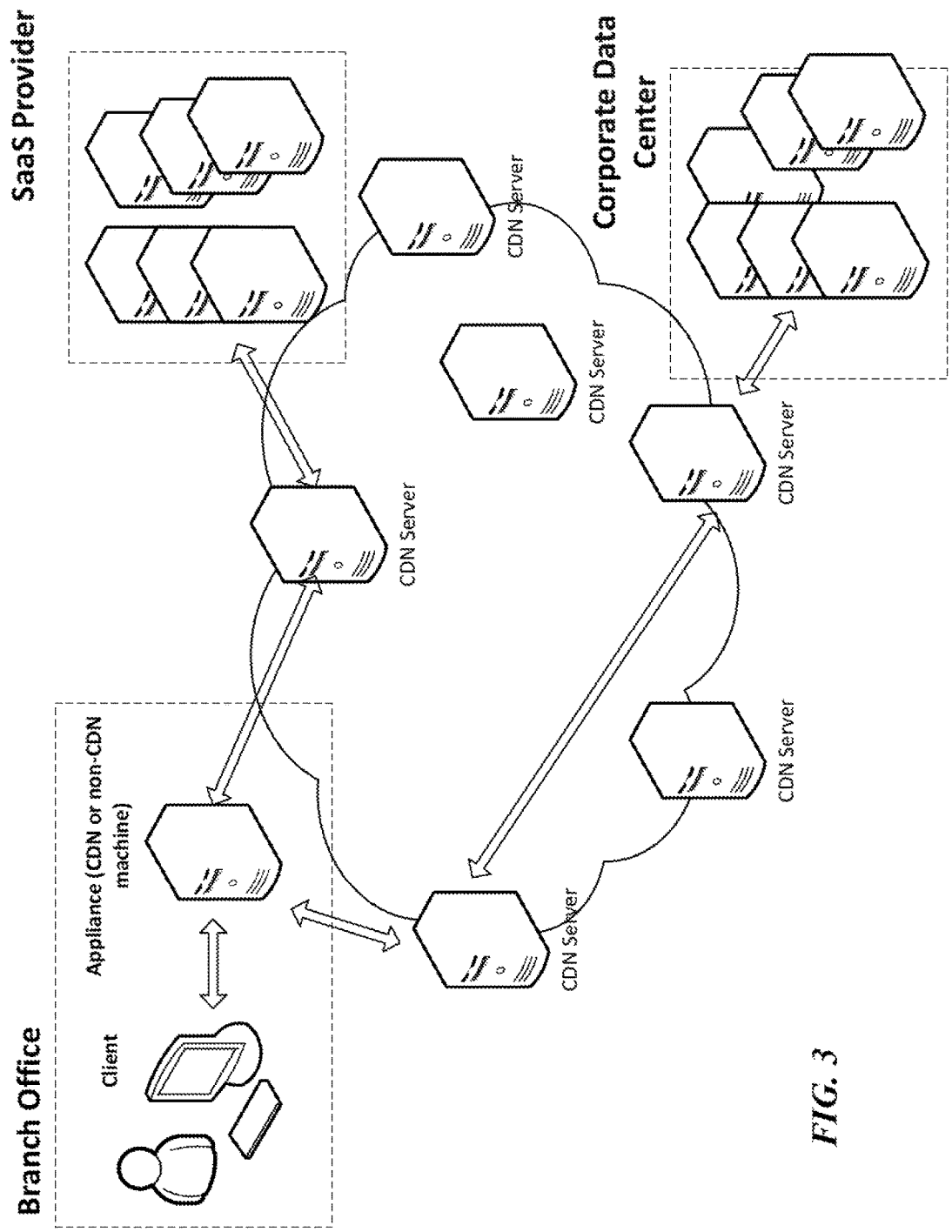
FIG. 3 is a schematic diagram illustrating one embodiment of message flow and acceleration across an overlay CDN platform.

In an alternate embodiment, a CDN employs Hologram servers in supplement to non-Hologram HTTP proxy servers, as illustrated previously in connection with FIG. 2 and FIG. 4b.

In this alternate embodiment, a Hologram server is still responsible for going forward to origin to fetch and cache Hologram-enabled API responses, storing tokens and indexing upon them for rapid access by token, and for receiving and propagating token invalidations as fast as possible, and can otherwise operate as described in connection with FIG. 6, above. However, the Hologram server sits behind a non-Hologram HTTP proxy, for example of the kind that populate a CDN platform without the benefit of the teachings hereof.

With non-Hologram HTTP proxy servers alone, a no-store or must-revalidate transaction typically has the type of flow shown in FIG. 8a (where the non-Hologram HTTP proxies are simply designated as 'Proxy'). In the notation used in FIG. 8a-e, arrows represent the direction of requests; content (in responses) flows left-to-right.

A TTL-based caching transaction has a type of flow shown in FIG. 8b, depending on where a valid, unexpired copy of the requested content is found.

In the case of the TTL-based caching, the first instance in FIG. 8b shows a cached response close to the client; the second instance shows a cached response close to the origin; and the third instance shows a cached response close to the origin.

We will now introduce Hologram nodes (notated "Holo"). Proxy servers will be asked to treat responses as no-store or must-revalidate (i.e., as dynamic objects) or as cacheable objects but with a very minor TTL such as a couple of seconds, while Hologram servers may be authoritative in caching. The Hologram network may be considered similar to a cache-hierarchy. This yields the flow possibilities shown in FIG. 8c.

In the first instance shown in FIG. 8c, long network traversal is avoided by a Hologram server having a cached document and understanding that as of that instant it is not aware of any token invalidation that renders it invalid; in the second instance, the Hologram server does not have a valid document, and forwards the request to a Hologram server close to origin for a second try (a cache choking technique); in the third instance, the long haul is necessary to contact origin for an authoritative answer.

Alternative, without Hologram reverse-mapping, the flow is as shown in FIG. 8d.

As before, active token invalidation assertions can emanate from origin and are propagated from the initial Hologram server receiving the invalidation to other Hologram servers using a publisher-subscriber or other technique, as shown in FIG. 8e.

Support for Message Flow within Hologram Nodes

Described below is an exemplary socket implementation for messaging within a Hologram node. The following is intended only to be a non-limiting example for purposes of illustrating a possible design.

In this embodiment, the Hologram nodes are designed Hologram nodes are designed with a set of socket operations that facilitate the message flows for support of Hologram subscriptions and invalidations. These operations can augment conventional HTTP proxy capabilities.

Figure 9:
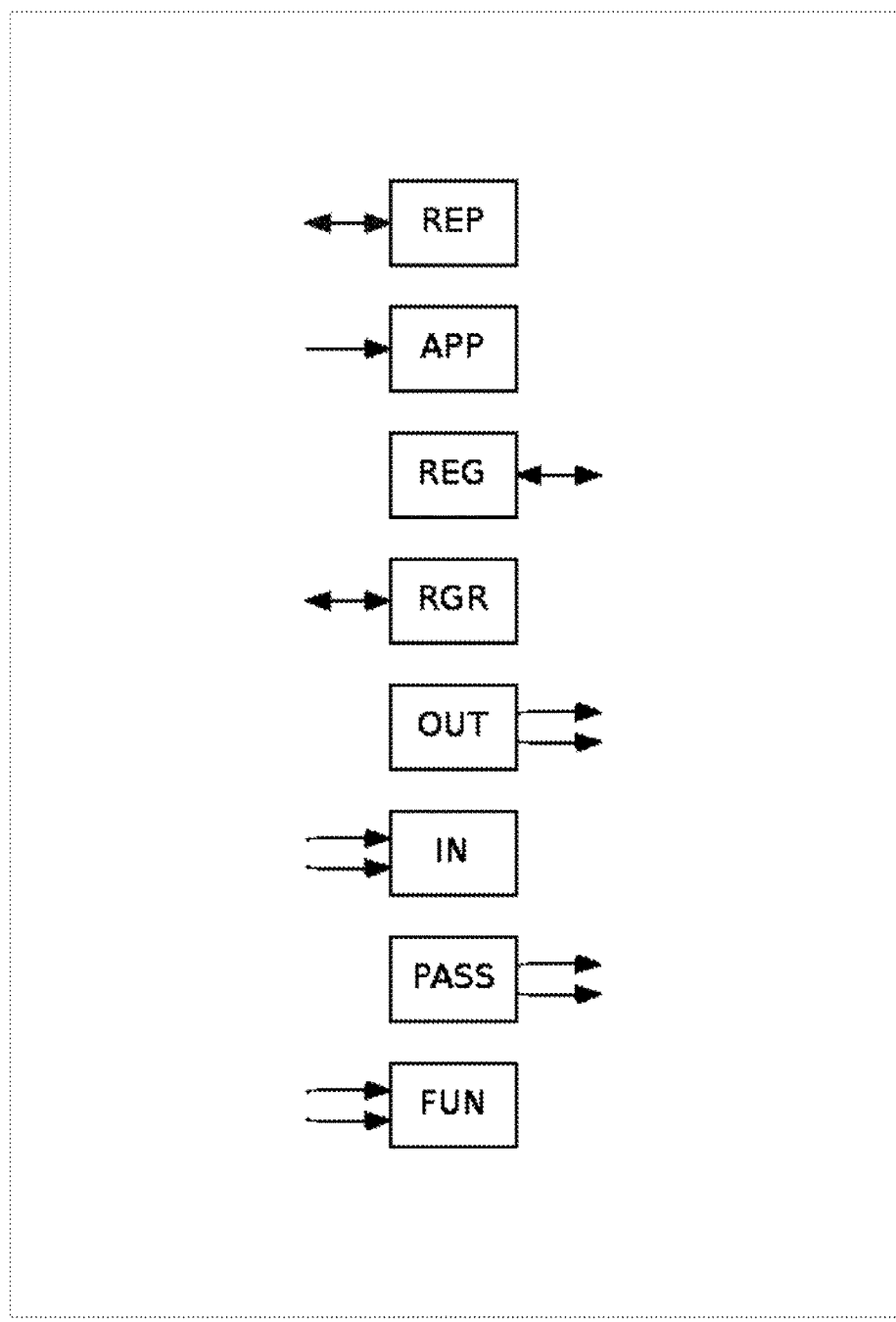
FIG. 9 is a schematic diagram illustrating an example of a socket set design for a node shown in FIGS. 6-7.

FIG. 9 shows an example socket set design that is from the perspective of a single Hologram server. The name shown on each box is a name in the Hologram server used to identify the variables holding references to the sockets and label the log lines showing communication to/from the socket. The type and function of each socket is described below.

In this example design, sockets are dedicated to limited function and thus two nodes may be connected with more than a single socket at the same time. An alternative design would consider these boxes to represent virtual handles to other nodes and for single sockets at most to be opened between nodes, with multiple message types carried on the same socket; queues, enforcement of and other details would differ in reasonably straightforward ways.

The design is based on messages, which implies a framing format for the beginning and end of messages, a maximum size for messages, and headers to carry source, destination, routing, and other message-passing information. A message queue library may be employed to provide this layer of functionality, or these rules can be designed on a custom basis. A subsystem of "heartbeat" messages between all nodes that normally communicate should be implemented in addition to the messages described below; a failed heartbeat should count as a broken connection, which particularly for subscribers should be deemed an involuntary unsubscription event.

This is design, the "IN" and "PASS" are not single sockets but arrays of sockets, starting at zero members and growing and shrinking with normal operation. For simplicity in explanation, this is not shown in FIG. 9.

The Hologram messaging system may be engineered to run in the same operating system process(es) as the HTTP proxy system, or it may be engineered to run separately, in which TCP sockets or an inter-process communication system native to the operating system may be used to pass messages from the HTTP proxy system to the Hologram messaging system. At least two types of messages are germane for this inter-process link; see below for messages arriving at REP and APP.

The following is a description of the message types.

"REP" is an object representing a listening socket that accepts multiple connections and performs the server side of a request-reply paradigm. The client side sending requests is the local HTTP proxy system on the same server.
Example Inbound Requests and Subsequent Replies:
Inquiry from HTTP proxy software about a domain, to see if it is subscribed.
Format: "SUB host HOP|FINAL"
e.g. "SUB example.com HOP"
Reply options:
Format: "OK PUB|SUB host timestamp"
e.g. "OK PUB example.com 123456789"
Format: "PENDING host"
e.g. "PENDING example.com"
Inquiry from HTTP proxy software for an incremented serial number for a domain.
Format: "SERIAL host"
e.g. "SERIAL example.com"
Reply:
Format: "SERIAL host server_id number"
e.g. "SERIAL example.com 1000 1234"

"APP" is an object representing a listening socket that accepts multiple connections and accepts messages, playing the role of pull in a push-pull paradigm. The push side sending requests is the local HTTP proxy system on the same server.
Example Inbound Messages:
Notification from HTTP proxy software that a token event should be processed.
Format: "DATA host token [@ server_id:number:timestamp]"
e.g. "DATA example.com users: 123@1000:1234: 123456789"

"REG" is an object representing a socket that connects form a normal node on the Hologram network to the registrar node on the Hologram network and performs requests in a request-reply paradigm. The opposite end of this socket will connect to "RGR" on the Hologram registrar; see "RGR" for message details. The Hologram registrar, if and when processing data as a normal node, will resolve registrar-related questions by "sending" a message on "REG" to "RGR" and processing the reply as a separate event.

"RGR" is an object representing a listening socket that accepts multiple connections and accepts messages from Hologram nodes and replies to them as the registrar. Preferably, all Hologram nodes have the capability to act as the registrar. An external monitoring system may signal all Hologram nodes when the registrar needs to change, either by changing a DNS entry or changing local configuration; alternatively, the Hologram nodes can rely on a failover strategy internal to the network.
Example Inbound Requests and Subsequent Replies:
Inquiry from a Hologram node to request the publisher identity for a host, and to provide for a default action of volunteering to be publisher if necessary.
Format: "GET host HOP|FINAL requester_ip_address"
e.g. "GET example.com HOP 1.2.3.4"
Reply:
Format: "KNOWN host ip_address"
e.g. "KNOWN example.com 1.2.3.4"
Format: "UNKNOWN host"
e.g. "UNKNOWN example.com"
Instruction from a Hologram node to clear its publisher status.
Format: "CLEAR host requester_ip_address"
e.g. "CLEAR example.com 1.2.3.4"
Reply:
Format: "OK CLEAR host cleared_ip_address"
e.g. "OK CLEAR example.com 1.2.3.4"

"OUT" is an object representing a listening socket that accepts multiple connections from other Hologram nodes subscribing to messages regarding domains for which the given node is the publisher. The Hologram node will publish token messages to subscribed nodes via the "OUT" object which ensures that the message is distributed to the connected subscribers, optionally filtering to limit messages to domains which the subscribers indicate, in order to allow all domains published from the same node to be published over the same sockets.

Messages sent over sockets in the "OUT" object arrive at the sockets in the "IN" objects at various other nodes.

"IN" is an array of zero or more objects representing sockets that connect to Hologram publisher "OUT" sockets to receive messages in a subscriber role or a publisher-subscriber paradigm. "IN" sockets are added to the array as the need arises to subscribe to per-host messages, which is typically determined by activity on the "REP" socket, followed by activity on the "REG" socket.

In order to bolster scalability of the network, Hologram "IN" nodes may make connections directly to broker nodes which make connections onto the final destination, thus making the overall number of connections on a fully-connected network lower than if every node connected to every other node. The organization of broker nodes may be hard-coded or nominated by dynamic election or other self-organizing strategy based in whole or part on configuration. Further, brokers may communicate with other brokers in arrangements to further separate direct connections.

If HTTP proxy activity for a particular host is not seen (by way of the "REP" socket) by a subscriber for some predetermined length of time, a node can unsubscribe from those messages on a per-host basis.
Example Inbound Messages:
Notification from a Hologram publisher that a token event should be processed.

Format: "DATA host token [@ server_id:number:timestamp]"
e.g. "DATA example.com users: 123@1000:1234: 123456789"
Notification from a Hologram publisher that publishing will discontinue for a host.
Format: "DATA host:END publisher_ip_address"
e.g. "DATA example.com:END 1.2.3.4"

"PASS" is an array of zero or more sockets opened to connect to other Hologram nodes which are publishers in order to pass message in the push role of a push-pull paradigm. Messages passed over "PASS" are token messages that originate off-publisher but must be made authoritative and propagated. The opposite end of this socket will connect to "FUN" on each Hologram publisher; see "FUN" for message details.

If a node has opened a "PASS" socket to a publisher but has had no messages to pass over to the peer, for any host, for 1800 seconds continuously (30 minutes), the "PASS" socket to that publisher is closed and removed from the array.

The existence of "PASS" sockets and the corresponding "FUN" sockets in the Hologram system can provide scalability in the subset of the network contacting origin; without them, all requests preferably go through one Hologram server to origin. The presence of "PASS"/"FUN" sockets is one mechanism to permit multiple Hologram nodes to go forward to origin for HTTP responses, as consequent Hologram invalidations retain a path through the network.

In the event that a Hologram node generates a token message but does not currently know the publisher for the given host (a situation that may arise in normal operation because the registrar has only received, at the time it was consulted by this node, GET calls with "HOP" status and no "FINAL" status for the last node before origin; also, may arise from abnormal operation such as a server restart), the node will pass the message to the registrar using a "PASS" socket. The registrar itself can act upon the message arriving at its "FUN" socket; see "FUN" for details.

"FUN" is an object representing a listening socket that accepts multiple connections and plays a pull role in a push-pull paradigm, to receive token messages from "PASS" sockets and acts upon them, usually by passing them to the "OUT" socket. The "FUN" socket on the registrar may give rise to the application-level queuing of a message. As soon as a publisher is determined, a "PASS" socket on the registrar is used to pass the queued messages to the publisher's "FUN" socket where normal operation will continue.

Example Inbound Message:
Notification from a Hologram peer that a token message should be propagated.
Format: "DATA host token [@ server_id:number:timestamp]"
e.g. "DATA example.com users: 123@1000:1234: 123456789"

Figure 10:
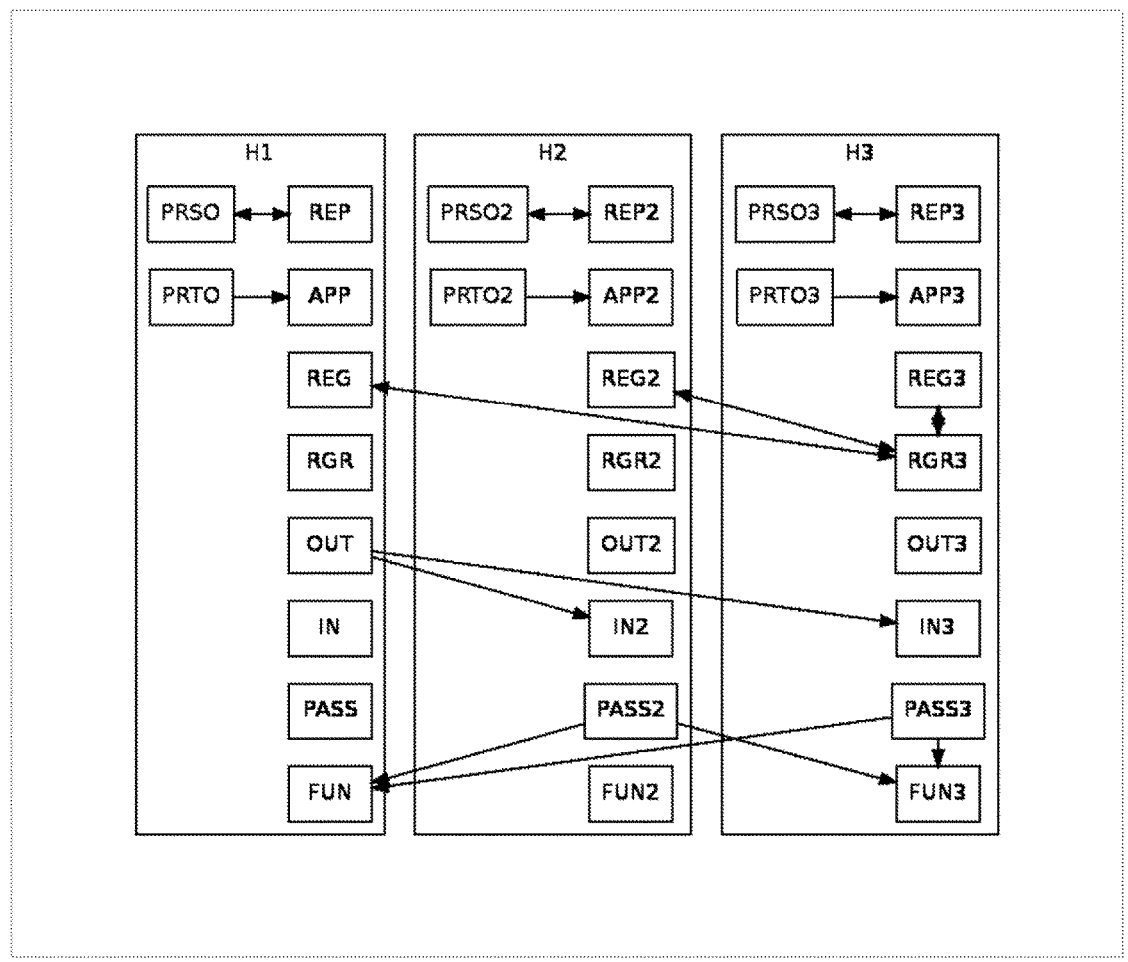
FIG. 10 is a schematic diagram illustrating an example network state for three nodes using the socket set design shown in FIG. 9.

In FIG. 10, an example network state is shown. "H1", "H2", and "H3" are nodes on a Hologram network. This is a non-limiting embodiment provided for purposes of illustration.

Within each node of this example, the "PRSO" (proxy subscriptions output) and "PRTO" (proxy tokens output) objects are sockets opened in the HTTP proxy software. There are one per Unix process on a multi-process proxy daemon, but for simplicity a single box is drawn for each. "PRSO" is an inter-process socket that plays a request role in a request-reply paradigm, to communicate with the "REP" socket of the Hologram adjunct software. "PRTO" is an inter-process socket that plays a push role in a push-pull to communicate with the "APP" socket of the Hologram messaging software.

In the example shown in FIG. 10, "H3" is acting as registrar. "REG", "REG2", "REG3" are all open to "RGR3" in order to facilitate queries necessitated by traffic arriving on "REP" sockets. "H1" is publishing for at least one domain, and "H2" and "H3" have both seen traffic for that domain, and subsequently subscribed to receive updates via "IN2" and "IN3".

Additionally, in FIG. 10, the reverse-map system has caused both "H2" and "H3" to become final hops before origin for domains for which "H1" is the publisher (possibly the same domain as above) and therefore "PASS2" and "PASS3" are open to "FUN". "H2" has been the final hop to a domain before it knew which node serves as publisher, and thus it has opened "PASS2" to "FUN3" as well, in order that the message be sent to the registrar.

Representing Selection & Sorting Criteria and Other Logic as Tokens

In some embodiments, certain tokens included in origin responses may not represent primary keys or sets of data, but rather may represent other portions of the queries relevant to response construction. Such tokens denote not that actual data in the response but the selection/sorting or other logic that was used to construct the response.

Consider an API call that shows "the latest 10 records" which can be the newest offers, news, deals, signups, etc.—whatever is appropriate for the API domain. As time passes and more records are added, the correct response has been altered potentially without a direct change to the data itself and therefore without a direct change to a token that was appended to a previous Hologram-enabled response. The responsive set of data has changed/updated, but the items of data themselves may not have. Thus we introduce tokens that account for the sorting or selection behavior present in the API call. In effect, these tokens are invalidated when the API response has become invalid not because the data within the API response has changed, as was the case in examples previously discussed, but because the sorting or selection of the data in the API response has become outdated. As such, the data in the API response is now the 'wrong' data to provide in response to the same API call.

Let us take a 'City Events' API as an example. This is an API offered to fetch data about events occurring in Boston.

```
GET /events/listings?sort=last_modified+desc&filters=category:
(Theater+Dance)&ll=40.766146,-73.99021&api-key=123
Host: api.city-events-example.com
...
X-Hologram-Data: ...,events:COUNTSORT
```

The "events:COUNTSORT" token is appended to the API response because the origin server knows that the API call references the sorting command. The "events:COUNTSORT" token can later be invalidated by origin every time the count of entries in the table is modified, thus correctly invalidating responses that depend on either the count or ordering of queries from the table.

As those skilled in the art will understand, such a 'selection/sorting' token can be used for API calls that return such things as "recent" events, or "trending" or "currently popular" events, and the like.

Range Tokens

In some cases, an application may call an API and submit a data range, such as an API that returns items of interest falling within a requested particular geographic area, e.g., as selected on a map by a user. The items of interest might be homes for sale, the location of particular stores or places of interest, pinpoints of where photos were taken, and the like. The systems and method described herein can be applied to these use cases.

Building upon the exemplary token syntactic rules described previously, range tokens can use, in one implementation square bracket characters for the purpose of defining range syntax in the form of [A . . . B] where A and B are integers or floating point numbers separated by two period characters and surrounded by square brackets; for example, "[1.1 . . . 3.14]" which notates a range from 1.1 to 3.14, inclusively. This notation is appended to an otherwise normal data token, for example, "age:[21 . . . 50]" to logically designate ages from 21 to 50 years old, inclusive. Consider, for purposes of illustration, an HTTP GET request generated by such an application that looks like the following:

```
GET /api/foo...
?lat=1.1234567890,1.1244567890...
&long=1.1234567890,1.1244567890...
&num=25...
...yielding...
Property 101 data
Property 123 data
Property 150 data
...
```

In this example, the latitude/longitude parameters represent a box from the four coordinates provided, and up to 25 results come back. Prior art TTL-based caching solutions may not cache this response very well because the positioning is so fine-grained. A slight change to the coordinates might result in a cache miss unless those particular coordinates had been requested by another client within the TTL. In certain embodiments, therefore, an origin can indicate that the result for a specific geographic box (or other data range) can be reused for similar boxes (or similar data ranges), as defined by a tolerance. To determine whether there is a cache hit, the caching server can interpret the requested URL parameters (lat/long) and apply some tolerance to them when looking for matching entries in cache index.

Next, to tokenize this kind of response for Hologram, an origin server can append tokens for each property identifier, which would enable the system to invalidate the cached response when data about that property changed (e.g., the price or status changed). To account for new properties or other things appearing within the geographic box, Hologram tokens relating to the particular coordinates can be used (e.g., latlong:a;b;c;d). However, such tokens are very specific, which can cause difficulties in trying to invalidate them. For example, an origin might have to determine that a previous set of coordinates (and tokens) should be invalidated based on a new property being added in the origin database. While such logic could be developed and placed in origin—for example logic invalidating all coordinates and tokens within some distance of the new item of interest—it places a burden on the origin and may not be accurate in all cases.

To better address this issue, in certain embodiments, an API response can be tagged with range tokens that reflect the entire range of data for which the response is dependent. In the foregoing example, a response with such tokens might be:

```
GET /api/foo...
?lat=1.1234567890,1.1244567890...
&long=1.1234567890,1.1244567890...
&num=25...
...yielding...
...
X-Hologram-Data: geo:[1.1234567890..1.1244567890][
1.1234567890..1.1244567890], property:101, property:123,
property: 150
...
Property 101
Property 123
Property 150
```

The origin can invalidate by a token corresponding to the particular coordinates at which the new property (or other new item of interest) is located. For example, assume a new Property 160 is added next door to Property 101 and within the box defined by the coordinates in the earlier request. The invalidation assertion can be as follows:

```
POST /hologram/invalidate HTTP/1.1
...
tokens=geo:[1.1234567899][1.1234567899]
```

In this case, the particular location described by the invalidation assertion is interpreted by a Hologram server as two specific points within ranges, one for latitude and one for longitude. Responses, like the example above, that were notated with latitude and longitude ranges encompassing the specific location in the invalidation assertion are identified and invalidated in cache.

In this way, responses can be notated with range tokens indicating the range of data values on which the response will depend. When an event occurs at origin within the data range, the origin can invalidate by an invalidation assertion as to a specific data point within the range.

This approach can be applied to a variety of data and circumstances where an API returns information based on a data range in the request. For example, in addition to the above, an API that returns events or TV shows or the like for a particular date or time range can be notated with the range, and if there is a new event added, or the schedule of events is rearranged, the responses covering that range can be invalidated through the above mechanism. In such a case, the token might include an invalidation for a sub-range of points within a range, e.g., by asserting that time range for a changed TV show within the larger schedule is now invalid.

Potential Advantages of the System

The following are some benefits that may be achieved with the disclosed teachings, but do not necessarily represent all such benefits and the description of such potential benefits does not mean that achieving such benefits are required or necessary to the practice of the teachings hereof.

Potential Advantage: Localization of Traffic

The techniques described herein may result in less content traffic traversing the platform, compared to "no-store" mode, and localization of content traffic for the API to regional at a platform edge. When a request is inbound to a Hologram server, it can look up the URL and serve the document.

Any non-Hologram proxies can be used to provide an additional layer of traditional TTL caching on the API responses in front of the Hologram proxies. A low TTL, in the realm of seconds, can be used. This would be useful for extremely high-traffic scenarios where the wide deployment of proxies is needed for fronting of massive public API traffic.

Potential Advantage: Origin Offload

Offload from origin servers may be achieved for a large segment of API responses while the data records they represent are "quiet".

Potential Advantage: Latency

Lowering of latency for clients may be achieved for a large segment of API responses while the data records they represent are "quiet". Clients that are normally hundreds of milliseconds "away" from origin may now find themselves receiving answers more often from Hologram servers located more closely, driving down latency for the end-user.

Coordinated Updates for Online Presence

The teachings hereof can be applied to a variety of kinds of content, other than API content, and can support coordinated content updates across a content provider's online presence. By way of illustration, assume a CDN content provider wishes to provide a feed for "top news" throughout its online presence. The data for the "top news" content may be realized in a document (e.g., XML document) that is taken up by the content provider's content management system for inclusion on a website page, that can be obtained by the content provider's mobile app for display to end-users who are using the app, and/or is available via an API at "contentprovider.com/API/topnews" for other clients. Leveraging the teachings hereof, a response from any of these systems (e.g., an html page from the web server, a mobile app response from the server handling the mobile app, and/or an API response) can be tagged with a token for the 'top news' document. When that document is updated, the token is invalidated, resulting in each of the different responses across the online presence being invalidated from a caching perspective, and driving a coordinated real-time update.

Computer Based Implementation

The clients, servers, and other computer devices described herein may be implemented with conventional computer systems, as modified by the teachings hereof, with the functional characteristics described above realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 11:
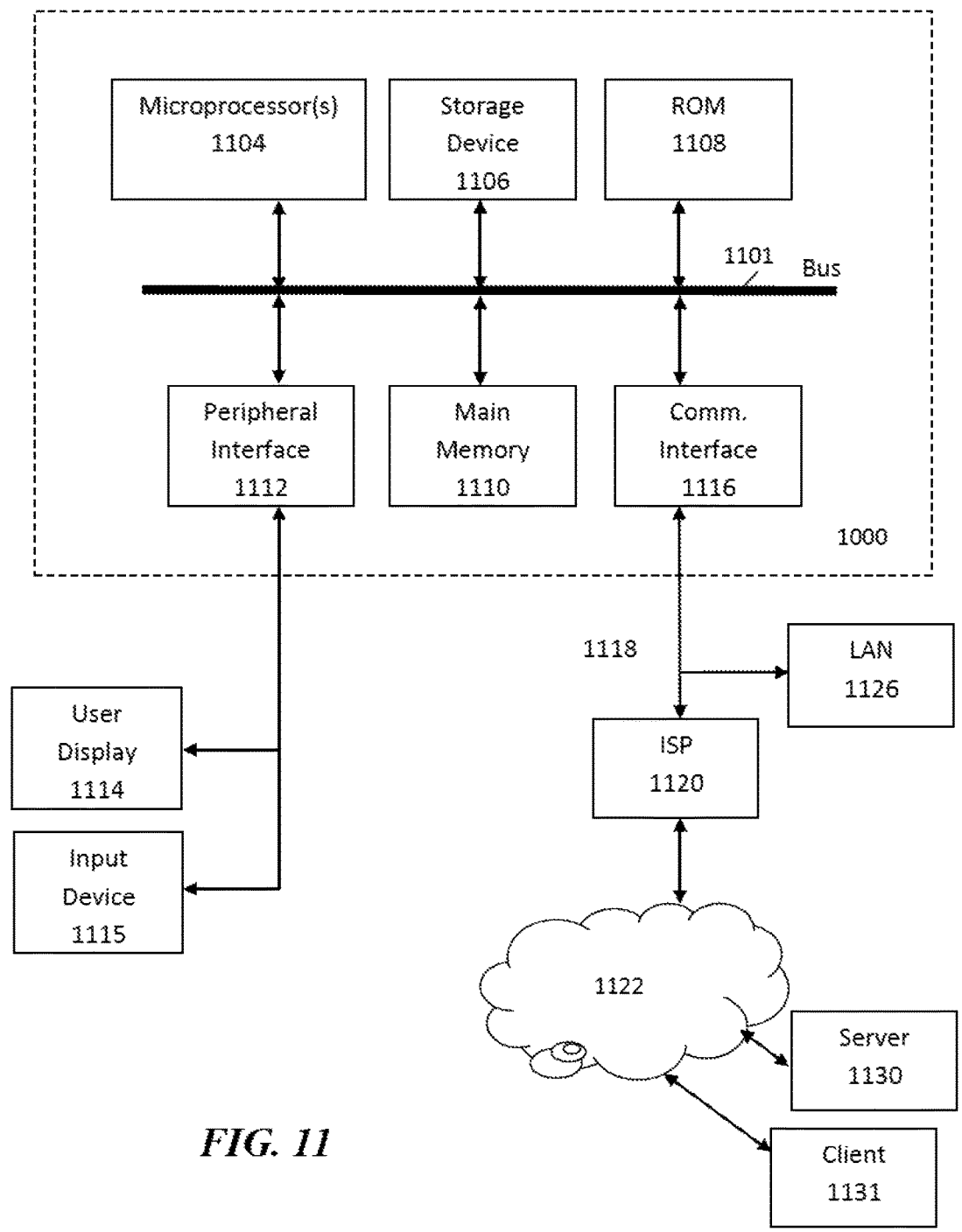
FIG. 11 is a block diagram illustrating hardware in a computer system that may be used to implement the teachings hereof.

FIG. 11 is a block diagram that illustrates hardware in a computer system 1100 in which embodiments of the invention may be implemented. The computer system 1100 may be embodied in a client, server, personal computer, workstation, tablet computer, wireless device, mobile device, network device, router, hub, gateway, or other device.

Computer system 1100 includes a microprocessor 1104 coupled to bus 1101. In some systems, multiple microprocessor and/or microprocessor cores may be employed. Computer system 1100 further includes a main memory 1110, such as a random access memory (RAM) or other storage device, coupled to the bus 1101 for storing information and instructions to be executed by microprocessor 1104. A read only memory (ROM) 1108 is coupled to the bus 1101 for storing information and instructions for microprocessor 1104. As another form of memory, a non-volatile storage device 1106, such as a magnetic disk, solid state memory (e.g., flash memory), or optical disk, is provided and coupled to bus 1101 for storing information and instructions. Other application-specific integrated circuits (ASICs), field programmable gate arrays (FPGAs) or circuitry may be included in the computer system 1100 to perform functions described herein.

Although the computer system 1100 is often managed remotely via a communication interface 1116, for local administration purposes the system 1100 may have a peripheral interface 1112 communicatively couples computer system 1100 to a user display 1114 that displays the output of software executing on the computer system, and an input device 1115 (e.g., a keyboard, mouse, trackpad, touchscreen) that communicates user input and instructions to the computer system 1100. The peripheral interface 1112 may include interface circuitry and logic for local buses such as Universal Serial Bus (USB) or other communication links.

Computer system 1100 is coupled to a communication interface 1116 that provides a link between the system bus 1101 and an external communication link. The communication interface 1116 provides a network link 1118. The communication interface 1116 may represent an Ethernet or other network interface card (NIC), a wireless interface, modem, an optical interface, or other kind of input/output interface.

Network link 1118 provides data communication through one or more networks to other devices. Such devices include other computer systems that are part of a local area network (LAN) 1126. Furthermore, the network link 1118 provides a link, via an internet service provider (ISP) 1120, to the Internet 1122. In turn, the Internet 1122 may provide a link to other computing systems such as a remote server 1130 and/or a remote client 1131. Network link 1118 and such networks may transmit data using packet-switched, circuit-switched, or other data-transmission approaches.

In operation, the computer system 1100 may implement the functionality described herein as a result of the microprocessor executing code. Such code may be read from or stored on a non-transitory computer-readable medium, such as memory 1110, ROM 1108, or storage device 1106. Other forms of non-transitory computer-readable media include disks, tapes, magnetic media, CD-ROMs, optical media, RAM, PROM, EPROM, and EEPROM. Any other non-transitory computer-readable medium may be employed.

Executing code may also be read from network link 1118 (e.g., following storage in an interface buffer, local memory, or other circuitry).

The client device may be a conventional desktop, laptop or other Internet-accessible machine running a web browser or other rendering engine, but as mentioned above the client may also be a mobile device. Any wireless client device may be utilized, e.g., a cellphone, pager, a personal digital assistant (PDA, e.g., with GPRS NIC), a mobile computer with a smartphone client, tablet or the like. Other mobile devices in which the technique may be practiced include any access protocol-enabled device (e.g., iOS™-based device, an Android™-based device, other mobile-OS based device, or the like) that is capable of sending and receiving data in a wireless manner using a wireless protocol. Typical wireless protocols include: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. The WAP (wireless access protocol) also provides a set of network communication layers (e.g., WDP, WTLS, WTP) and corresponding functionality used with GSM and CDMA wireless networks, among others.

In a representative embodiment, the mobile device is a cellular telephone that operates over GPRS (General Packet Radio Service), which is a data technology for GSM networks. Generalizing, a mobile device as used herein is a 3G—(or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. The teachings disclosed herein are not limited to any particular mode or application layer for mobile device communications.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A computer-implemented method performed by a content delivery network (CDN) server that has circuitry forming one or more processors and memory holding instructions for execution by the one or more processors, the method comprising:

receiving a response having appended thereto a first token, the first token comprising a moniker and a serial number and the first token corresponding to any of data and logic at a remote source upon which the content of the response depends;

caching the response and the first token;

receiving a message, the message comprising a second token, the second token comprising a moniker and a serial number, and in response to the message, storing the second token in a cache of current tokens;

wherein the moniker of the second token is the same as the moniker of the first token;

after receiving the message, receiving a client request that includes a domain name;

determining that the cached response is responsive to the client request;

before using the cached response to respond to the client request, comparing the serial number of the first token with the serial number of the second token;

upon a determination that the serial number of the first token matches the serial number of the second token, serving the cached response to the client;

upon a determination that the serial number of the first token is different than the serial number of the second token, determining to send a forward request to the remote source to obtain a response with current content.

2. The method of claim 1, wherein the message is received from another CDN server.

3. The method of claim 2, wherein the another CDN server generates the message upon receipt of a write request.

4. The method of claim 1, where the message is received from the remote source.

5. The method of claim 1, further comprising: subscribing to a subscription channel associated with the domain name to receive invalidation messages for tokens associated with the domain name.

6. The method of claim 5, wherein the subscription channel is provided by another CDN server.

7. The method of claim 1, wherein the domain name is associated with an application programmer interface (API).

8. The method of claim 1, where the client request comprises a request for service from an application programmer interface (API).

9. A computer-implemented method performed by a content delivery network (CDN) server that has circuitry forming one or more processors and memory holding instructions for execution by the one or more processors, the method comprising:

receiving a response having appended thereto a first token, the first token comprising a moniker and a timestamp and the first token corresponding to any of data and logic at a remote source upon which the content of the response depends;

caching the response and the first token;

receiving a message, the message comprising a second token, the second token comprising a moniker and a timestamp, and in response to the message, storing the second token in a cache of current tokens;

wherein the moniker of the second token is the same as the moniker of the first token;

after receiving the message, receiving a client request that includes a domain name;

determining that the cached response is responsive to the client request;

before using the cached response to respond to the client request, comparing the timestamp of the first token with the timestamp of the second token;

upon a determination that the timestamp of the first token matches the timestamp of the second token, serving the cached response to the client;

upon a determination that the timestamp of the first token is different than the timestamp of the second token, determining to send a forward request to the remote source to obtain a response with current content.

10. The method of claim 9, wherein the message is received from another CDN server.

11. The method of claim 10, wherein the another CDN server generates the message upon receipt of a write request.

12. The method of claim 9, where the message is received from the remote source.

13. The method of claim 9, further comprising: subscribing to a subscription channel associated with the domain name to receive invalidation messages for tokens associated with the domain name.

14. The method of claim 13, wherein the subscription channel is provided by another CDN server.

15. The method of claim 9, wherein the domain name is associated with an application programmer interface (API).

16. The method of claim 9, where the client request comprises a request for service from an application programmer interface (API).

* * * * *